United States Patent [19]
Ohnuki et al.

[11] Patent Number: 5,639,563
[45] Date of Patent: Jun. 17, 1997

[54] MAGNETO-OPTICAL RECORDING MEDIUM

[75] Inventors: Satoru Ohnuki; Katsusuke Shimazaki; Norio Ohta; Hideo Fujiwara; Masafumi Yoshihiro; Noriyuki Ogihara; Yukinori Yamada, all of Ibaraki-ken, Japan

[73] Assignee: Hitachi Maxell, Ltd., Osaka, Japan

[21] Appl. No.: 247,119

[22] Filed: May 20, 1994

Related U.S. Application Data

[63] Continuation of Ser. No. 740,496, Aug. 5, 1991, abandoned.

[30] Foreign Application Priority Data

| Aug. 7, 1990 | [JP] | Japan | 2-207525 |
| Sep. 6, 1990 | [JP] | Japan | 2-234372 |
| Sep. 27, 1990 | [JP] | Japan | 2-255263 |
| Jun. 20, 1991 | [JP] | Japan | 3-174709 |
| Jul. 29, 1991 | [JP] | Japan | 3-210430 |

[51] Int. Cl.$^6$ .................. H01F 1/00; G11B 5/66; G11B 5/70

[52] U.S. Cl. .................. 428/611; 428/336; 428/694 SC; 428/694 RL; 428/694 DE; 428/694 LE; 428/900; 369/13

[58] Field of Search .................. 428/694 SC, 694 RL, 428/694 DE, 693 LE, 900, 611, 336; 369/13

[56] References Cited

U.S. PATENT DOCUMENTS

| 3,949,387 | 4/1976 | Chandhari et al. | 340/174 YC |
| 4,645,722 | 2/1987 | Katayama et al. | 428/694 ML |
| 4,649,519 | 3/1987 | Sun et al. | 365/122 |
| 4,717,628 | 1/1988 | Takahashi et al. | 428/694 ML |
| 4,749,549 | 6/1988 | Yamashita et al. | 204/192.15 |
| 4,950,556 | 8/1990 | Willson et al. | 428/694 ML |

(List continued on next page.)

FOREIGN PATENT DOCUMENTS

| 0257530 | 3/1988 | European Pat. Off. . |
| 0258978 | 3/1988 | European Pat. Off. . |
| 368194 | 5/1990 | European Pat. Off. . |
| 0369610 | 5/1990 | European Pat. Off. . |
| 125950 | 7/1985 | Japan . |
| 262446 | 10/1988 | Japan . |
| 066847 | 3/1989 | Japan . |

OTHER PUBLICATIONS

Hoshi et al "Influence of $O_2$ and $N_2$ addition on the perpendicular magnetic anisotopy of Gd–Co amorphous films", *J. Appl. Phys:* 53(3): Mar. 1982; pp. 2344–2346.

Togamr et al "Increase in Uniformity of Amorphous gdCo films by control of Oxygen Quantity"; *Jap. J. Appl. Phys:* 20(8), Aug. 1981; pp. 1457–1465.

Esho "Perpendicular Magnetic anisotropy in Sputtered GdCo films"*J. Appl. Phys.* 50(2), Feb. 1979; pp. 1006–1009.

Heitmann et al "Influence of nitrogen, oxygen and water on magntic properties of dc magnetron spattered GdTbFe Films", *J. Appl. Phys:* 61(8); Apr. 1987, pp. 3343–3345.

Database WPIL, No. 90–167 695, Derwent Publications Ltd., London, GB, and JP–A–02–108256 (Mitsui Petrochem Ind. K.K.) Apr. 20, 1990, abstract only.

*Primary Examiner*—Paul J. Thibodeau
*Assistant Examiner*—Stephen Sand

[57] ABSTRACT

A magneto-optical recording medium having a thin film with a suitable thermal conductivity, laminated on magneto-optical film, having excellent durability to repeated recording, reproducing and erasing comprising one layer or a multi-layer of thin film containing at least a magneto-optical recording film carried on a transparent substrate, a ferromagnetic reflection film having a reflectance to a reproduction beam of 70% or higher and a thermal conductivity at a normal temperature from 0.05 to 2.0 W/cm.deg laminated on the backside of the magneto-optical recording film viewed from the transparent substrate side and, optionally, a heat control layer having a thermal conductivity at a normal temperature of 0.1 to 2.0 W/cm.deg may be laminated on the backside of the magneto-optical film.

30 Claims, 23 Drawing Sheets

U.S. PATENT DOCUMENTS

| | | | |
|---|---|---|---|
| 4,988,578 | 1/1991 | Yamashita et al. | 428/678 |
| 5,066,552 | 11/1991 | Howard et al. | 428/694 ML |
| 5,132,945 | 7/1992 | Osato et al. | 369/13 |
| 5,204,193 | 4/1993 | Sato et al. | 428/694 R |
| 5,239,524 | 8/1993 | Sato et al. | 369/13 |

ERASING DIRECTION    RECORDING DIRECTION

FIG. 20

| HEAT DIFFUSION FILM | Aℓ Cr 750Å |
|---|---|
| MULTIPLE INTER-FERENCE FILM | AℓSiON 300Å |
| RECORDING FILM | TbFeCo 250Å |
| MULTIPLE INTER-FERENCE FILM | AℓSiON 800Å |
| SUBSTRATE | POLYCARBONATE |

(MAXIMUM OUTPUT AT PULSE WIDTH OF 60 ns, PIT INTERVAL OF 1.53 μm AND LINEAR SPEED OF 7.54 m/s)

FIG. 24

| | CONDITIONS FOR FORMING RECORDING FILM | | | C/N (dB) | SATURATED RECORDING MAGNETIC FIELD (Oe) | ERASING MAGNETIC FIELD (Oe) | CONTENT OF N OR O IN FILM | |
|---|---|---|---|---|---|---|---|---|
| | VACUUM DEGREE FOR SUBSTRATE DEAERATION | SPATTER GAS | HEAT TREATMENT AFTER FILM FORMATION | | | | N (at %) | O (at %) |
| ① | $5 \times 10^{-5}$ Pa | PURE Ar | 80°C 15min (UNDER $5 \times 10^{-5}$ Pa) | 55 | 130 | 100 | 1.0 | 0.3 |
| ② | $2 \times 10^{-5}$ Pa | Ar+N$_2$(1%) | — | 55 | 110 | 100 | 4.5 | <0.1 |
| ③ | $2 \times 10^{-4}$ Pa | PURE Ar | 40°C 30min (UNDER $3 \times 10^{-4}$ - $5 \times 10^{-5}$ Pa) | 55 | 120 | 100 | 2.0 | 0.5 |
| ④ | $2 \times 10^{-5}$ Pa | Ar+O$_2$(0.5%) | — | 55 | 120 | 100 | <0.1 | 2.5 |
| ⑤ | $2 \times 10^{-5}$ Pa | Ar +N$_2$(0.4%) +O$_2$(0.1%) | — | 55 | 120 | 100 | 2.0 | 0.5 |
| COMPARATIVE EXAMPLE | ~$10^{-5}$ Pa | PURE Ar | — | 55 | 250 | 250 | <0.1 | <0.1 |

↑ : TRANSITION METAL MOMENT
⇑ : RARE EARTH METAL MOMENT

MAGNETO-OPTICAL RECORDING MEDIUM

This application is a continuation, of application Ser. No. 07/740,946 filed on Aug. 5, 1991, now abandoned.

BACKGROUND OF THE INVENTION

1. Field of the Invention

The present invention relates to a magneto-optical recording medium and, more specifically, to a material of a thin film containing at least a magneto-optical recording film laminated on one side of a transparent substrate and to the laminated structure.

2. Discussion of Related Art

A data recording medium using a magneto-optical recording medium is now at the stage of practical use, and thus it is an increasingly important technical problem to provide a magneto-optical recording medium which has an overwrite function, a higher reproduction CN ratio, and further an excellent property for preserving data for a long time, the overwrite function being a function, by which, when new data is to be written to an area to which previous data has been recorded, the new data can be simultaneously written while the previously recorded data is being deleted or without the need for erasing the previously recorded data, instead of that whereby the new data is written after the previously recorded data has been erased once.

Fundamentally, the magneto-optical recording medium can be made by providing a magneto-optical recording film on one side of a transparent substrate, the magneto-optical recording film being composed of, for example, a rare earth metal-transition metal type amorphous vertically-magnetized film, Pt—Mn—Sb type alloy (Heusler alloy) film, laminated substance of a Pt film and Co film, Mn—Bi type alloy film (crystalline substance), oxide film, and the like which can thermomagnetically carry out recording and erasing, and magneto-optically reproduce recorded signals when irradiated by a laser beam. The above various characteristics, however, cannot be realized only by the fundamental arrangement and the arrangement cannot be practically used. Thus, various technologies have been conventionally proposed to provide the above various characteristics.

As described in, for example, Japanese Patent Application (Laid-Open) No. Sho 63-241739, technology for providing an overwrite function with a magneto-optical recording medium is such that a ferrimagnetic thin film having a compensating temperature higher than room temperature is used as a magneto-optical recording film and an in-plane magnetized layer, the magnetizing direction of which is adjusted to be parallel with the film surface of the ferrimagnetic thin film, is formed on the surface thereof to restrict the generation of a Bloch line so that data can be overwritten by an optical modulation system.

As described in, for example, Japanese Patent Application (Laid-Open) No. Sho 57-169996, technology for improving a reproduction CN ratio is such that an enhanced layer composed of an inorganic dielectric substance having an index of refraction higher than that of a transparent substrate, magneto-optical recording layer, protective layer composed of a material similar to that of the above enhanced layer, and reflection layer composed of a metal material having a high reflectance are each laminated on one side of the transparent substance sequentially from the transparent substrate side. According to the magneto-optical recording medium, since the enhanced layer is provided on the boundary between the transparent substrate and the magneto-optical layer, an optical beam for reproduction is multi-reflected between the transparent substrate and the magneto-optical recording layer so that the light beam for reproduction is multi-reflected between the transparent substrate and the magneto-optical recording layer to thereby increase the apparent Kerr rotation angle of the polarization rotation of a linearly polarized beam reflected off the film. Further, since the protective layer and reflection layer are sequentially laminated on the backside of the magneto-optical recording film viewed from the transparent substrate side, the optical beam for reproduction passing through the magneto-optical recording film can be reflected in the reflection layer and returned to the transparent substrate 1 side, so that an apparent Kerr rotation angle of the polarization rotation of a linearly polarized beam reflected off the film can be further increased by the Faraday effect received by the optical beam when it passes through the magneto-optical layer (reciprocating process). Since the reproduction CN ratio is in proportion to a product of a Kerr rotation angle and reflectance, the magneto-optical recording medium can provide a high reproduction CN ratio.

Alternately, as described in, for example, Japanese Patent Application (Laid-Open) No. Sho 61-188762, another example for improving a reproduction CN ratio of a magneto-optical recording medium is such that an in-plane magnetized layer is provided on the boundary between a transparent substrate and a rare earth metal-transition metal type amorphous vertically-magnetized film as a magneto-optical recording film and on the surface of the above amorphous vertically-magnetized film, and the thickness of the amorphous vertically magnetized film and in-plane magnetized layer is specified to increase a Kerr rotation angle and the rectangularity of a Kerr hysteresis.

As described in, for example, Japanese Patent Application (Laid-Open) No. Sho 60-231935, a technology for improving the data preserving property of a magneto-optical recording medium is such that a rare earth metal-transition metal type amorphous vertically-magnetized film as a magneto-optical recording film is provided on a transparent substrate and an in-plane magnetized layer composed of a rare earth metal or transition metal similar to the above or an alloy of them and a protective layer composed of silicon nitride are sequentially formed on the surface of the amorphous vertically-magnetized film to prevent the oxidization and deterioration of the amorphous vertically-magnetized film.

Nevertheless, these conventional proposals do not take into consideration at all the effect of heat applied by a laser beam focusing on a magneto-optical recording film when data is recorded, reproduced or erased. In particular, since they do not take into consideration the problem of thermal diffusion and thermal capacity in a thin film provided in contact with the magneto-optical recording film (which is referred to as an adjacent film), the following technical problems arise:

(1) When the thermal diffusion in the adjacent film is too late or when the thermal capacity thereof is too large, a large laser power is required to record and erase data and thus a drive unit becomes expensive;

(2) When the thermal diffusion of the adjacent film is too late, much heat is accumulated in the portion where a laser spot is irradiated and thus a change, such as a structural easing, crystallization and the like is liable to be made to the magneto-optical recording film. Further, although a preformat pattern for optically reading out data is formed in a fine irregular shape on a transparent substrate where a thin film is formed, the preformat pattern is liable to be thermally deformed by the heat produced when a laser beam is irradiated. Consequently, as data is repeatedly recorded, reproduced and erased, the level of a reproduced signal is gradually lowered and the reproduction of data becomes impossible within a relatively short period;

(3) When the thermal capacity of the adjacent film is too small and the thermal diffusion therein is too late, a problem is liable to arise in that reproduction output is varied, recorded data is destroyed by the change of an atmospheric temperature, and the like in addition to the disadvantage of the above item (2);

(4) Since a conventional medium needs a large external magnetic field for recording and erasing, overwrite using a magnetic modulation system is impossible, because a large magnetic field is difficult to be switched at a high speed. Therefore, a medium requiring a small magnetic field for recording and erasing is needed.

SUMMARY OF THE INVENTION

An object of the present invention carried out to overcome the disadvantages of the prior art is to provide a magneto-optical recording medium in which the level of a reproduced signal is not lowered even if data is repeatedly recorded, reproduced and erased, and which has excellent durability.

To achieve the above object, first, the present invention is characterized in a magneto-optical recording medium comprising one layer or a multi-layer thin film containing at least a magneto-optical recording film carried on a transparent substrate, wherein a ferromagnetic reflection film having a reflectance to a reproduction beam of 70% or higher and a thermal conductivity at a normal temperature of from 0.05 to 2.0 W/cm.deg is laminated on the backside of the magneto-optical recording film viewed from the transparent substrate side.

Second, the present invention is characterized in a magneto-optical recording medium comprising one layer or a multi-layer thin film containing at least a magneto-optical recording film carried on a transparent substrate, wherein a heat control layer having a thermal conductivity at a normal temperature of from 0.1 to 2.0 W/cm.deg is laminated on the backside of the magneto-optical recording film viewed from the transparent substrate side.

Further, the present invention is characterized in a magneto-optical recording medium comprising one layer or a multi-layer thin film containing at least a magneto-optical recording film carried on a transparent substrate, wherein an auxiliary magnetic film having a spontaneous magnetization is provided so as to come into contact with the magneto-optical recording film and a difference between the Curie temperature of the auxiliary magnetic film and that of the magneto-optical recording film is regulated within 150° C.

Next, a material used for the auxiliary magnetic film is such that the magnetic moment of the auxiliary magnetic film is easily rotated in the vicinity of the Curie temperature thereof by being affected by the direction of an external magnetic field so that the auxiliary magnetic film produces a vector component having a direction similar to that of the external magnetic field and maintains an exchange bonding force to the magneto-optical recording film.

Further, a magnetic material may be selected and used as a material for the auxiliary magnetic film so that the direction of the magnetic moment of the transition metal site of the auxiliary magnetic film is made opposite to the direction of the total magnetization of the above magneto-optical recording film at least in the vicinity equal to or less than the Curie temperature of the magneto-optical recording film. Alternately, a magnetic material may be selected and used as a material for the auxiliary magnetic film so that the direction of the magnetic moment of the transition metal site of the auxiliary magnetic film is made similar to the direction of the total magnetization of the above magneto-optical recording film at least in the vicinity equal to or less than the Curie temperature of the magneto-optical recording film.

BRIEF DESCRIPTION OF THE DRAWINGS

FIG. 20 is a table showing an example of the composition and film thickness of each film laminated to the magneto-optical recording medium in the third embodiment;

FIG. 24 is a table showing the manufacturing method, reproduction CN ratio, saturated recording magnetic field, erasing magnetic field, and mixing ratios of N and O of the magneto-optical recording medium according to each experimental example and comparative example in the third embodiment;

Figure 1:
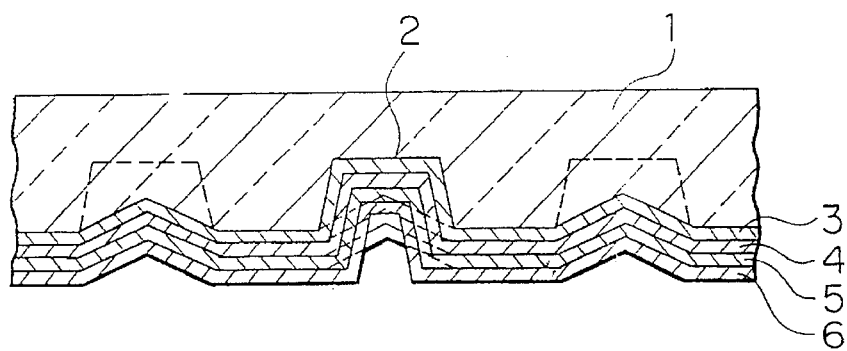
FIG. 1 is a cross sectional view of the main part of a magneto-optical recording medium according to a first embodiment of the present invention.

DESCRIPTION OF REFERENCE NUMERALS 1 transparent substrate
2 preformat pattern
3 enhancement layer or film
4 magneto-optical recording layer
5 ferromagnetic reflection film
6 protective layer
7 enhancement film
8 heat control layer
9 auxiliary magnetic film
10 protective film

DETAILED DESCRIPTION OF THE INVENTION

When the thermal conductivity of the adjacent film of a magneto-optical recording film (a ferromagnetic reflection film in the above first means, a heat control layer in the above second means) is regulated within the range shown in the above means, thermal diffusion is properly carried out when a laser beam is irradiated. Thus, laser power necessary to record and erase data need not be increased and further the reduction of a reproduction signal level caused when data is repeatedly recorded, reproduced and erased can be prevented in a great amount.

Note, that according to the above first means, since the ferromagnetic reflection film is laminated on the backside of the magneto-optical recording film, a magnetic interaction is produced between the magneto-optical recording film and the ferromagnetic reflection film, so that the sensitivity of an external magnetic field is improved when data is recorded and erased. As a result, a smaller external magnetic field enables data to be perfectly recorded/erased and thus data can be overwritten by a magnetic field modulation system. Further, since a material having a high reflectance to a reproduction beam of 70% or more is used as the ferromagnetic reflection film, a laser beam for reproduction passing through the magneto-optical recording film can be returned to the transparent substrate side again by being reflected in the ferromagnetic reflection film, so that an apparent Kerr rotation angle can be increased by the Faraday effect applied to the laser beam for reproduction when it reciprocally passes through the magneto-optical recording film, whereby a high reproduction CN ratio can be provided.

When the above auxiliary magnetic film, i.e., the above ferromagnetic reflection film is regulated so that the Curie temperature of the auxiliary magnetic film is equal to that of the magneto-optical recording film within the difference of 150° C., the magnetic moment of the above auxiliary magnetic film can be easily rotated in the direction of an external magnetic field, provided with a vector component in this direction and applying an exchange coupling force to the above magneto-optical recording film when a laser beam is irradiated to record and to erase data, which exhibits a different effect depending upon the direction of the moment of a transition metal with respect to the direction of the total magnetization of the above magneto-optical recording film.

When the direction of the moment of the transition metal is the same as that of the total magnetization of the above magneto-optical recording film, since the exchange interaction acting between the magnetic moment of the above auxiliary magnetic filed rotated in the direction of the external magnetic field and the moment of the transition metal of the magneto-optical recording film acts to support the external magnetic field, the coercive force of the above magneto-optical film is greatly lowered as compared with a single layer, by which magnetization is liable to be rotated in the direction of the external magnetic field, i.e., data can be sufficiently recorded and erased.

Figure 30:
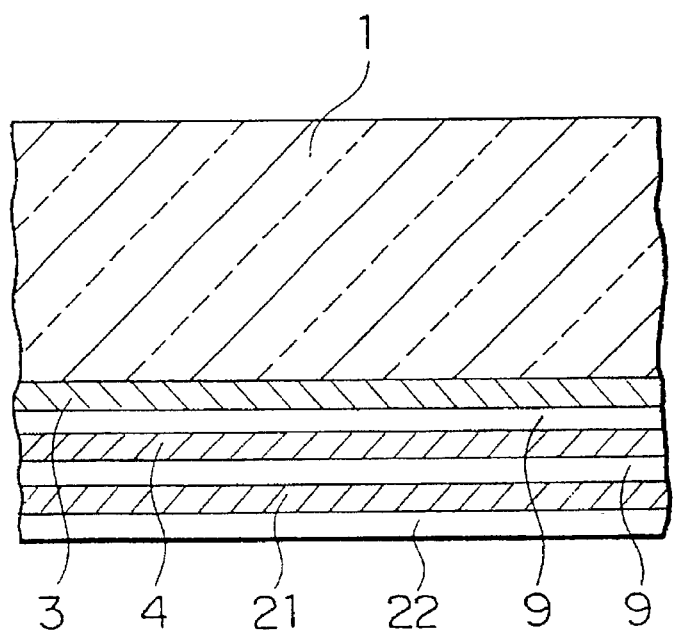
FIG. 30 is a cross sectional view of another modified example of the magneto-optical recording medium according to the fourth embodiment.

On the other hand, when the direction of the moment of the transition metal is opposite to that of the total magnetization of the above magneto-optical recording film, a medium, which records new data without the need for an erasing operation, can be provided by the structure shown in FIG. 30 by using a material in which such a state exists that the energy, which is produced by the exchange interaction acting between the magnetic moment of the above auxiliary magnetic film rotated in the direction of the external magnetic field and the moment of the transition metal of the magneto-optical recording film, is superior to the energy produced by the interaction between the total magnetization of the magneto-optical recording film and the external magnetic field, that is, overwriting is made possible.

PREFERRED EMBODIMENTS

First Embodiment

The first embodiment of the present invention will be described with reference to FIGS. 1 to 5. FIG. 1 is a cross sectional view of the main part of a magneto-optical recording medium according to the present invention and, as shown in the figure, the magneto-optical recording medium of the first embodiment comprises an enhancement film 3 composed of an inorganic dielectric substance having an index of refraction higher than that of the transparent substrate 1, a magneto-optical recording film 4, a ferromagnetic reflection film 5 and a protective layer 6 sequentially laminated on the transparent substrate 1 where a preformat pattern 2 is formed from the side thereof.

The transparent substrate 1 is composed of a plastic material such as, for example, polycarbonate, polymethylmethacrylate, polyolefine, epoxy and the like and a transparent material such as glass formed to a desired shape, such as a disk shape or card shape.

The preformat pattern 2 composed of a guide groove for guiding a laser spot and a prepit train exhibiting an address and the like of a recording track defined along the guide groove is formed on one side of the transparent substrate 1 in a fine irregular shape to enable a tracking servo signal and preformat signal to be optically read out. Note, that although the preformat pattern 2 is directly formed on one side of the transparent substrate 1 in FIG. 1, it is also possible that a photo-curing resin layer having an index of refraction close to that of a flatly shaped transparent substrate is formed on one side thereof and the above preformat pattern 2 is transferred to the surface of the photo-curing resin layer.

The enhancement film 3 is provided to increase an apparent Kerr rotation angle by multi-interferring a light beam between the magneto-optical recording film 4 and the transparent substrate 1, composed of an inorganic dielectric substance having an index of refraction larger than that of the above transparent substrate 1, such as nitride and oxide of silicon, aluminium, zirconium, titanium, and tantalum, for example, SiN, $SiO_2$, $Al_2O_3$, AlSiON, SiON, $Ta_2O_5$, and $ZrO_2$, wherein AlSiON is an abbreviation for $Al_aSi_bO_cN_d$ (a, b, c, and d are arbitrary numbers), SiON is an abbreviation for $Si_eO_fN_g$ (e, f and g are arbitrary numbers) and SiN is an abbreviation for $Si_3N_4$. The enhancement film is formed to a thickness of from 600 to 1000 angstroms. Sputtering is particularly preferable as a means for forming the enhanced film 3.

The magneto-optical recording film 4 can be formed by using any arbitrary known magneto-optical recording material such as a rare earth metal-transition metal type amorphous vertically-magnetized film, PtMnSb alloy (Heusler alloy), laminated substance of a Pt film and Co film, Mn—Bi type alloy (crystalline substance) and the like, and in particular the rare earth metal-transition metal type amorphous vertically-magnetized film is preferable.

The rare earth metal-transition metal type amorphous vertically-magnetized film represented by the following general formula is particularly preferable:

General Formula;

$$Tb_xFe(100-X-Y-Z)^{Co}Y^MZ,$$

where, 15 at % $\leq X \leq 30$ at %

5 at % $\leq Y \leq 15$ at %

0 at % $\leq Z \leq 10$ at %,

M is a at least one kind of element selected from Nb, Cr and Pt.

The vertically-magnetized film is formed to a film thickness of from 200 to 500 angstroms by sputtering a target formed by an alloy of Tb, Fe, Co and an additive element M or a sintered substance containing these elements.

The ferromagnetic reflection film 5 is formed from a material having a reflectance to a reproduction beam of 70% or higher and a thermal conductivity at a normal temperature regulated to the range of from 0.05 to 2.0 W/cm.deg, and the thickness of the ferromagnetic reflection film is suitably in the range of from 200 to 400 angstroms. More specifically, since one of the characteristics of the magneto-optical recording medium of this example is that a reproduction beam passing through the magneto-optical recording film 4 is returned to the transparent substrate 1 side by the ferromagnetic reflection film 5, and an apparent Kerr rotation angle is increased by the Faraday effect applied to an incident beam and return beam when they pass through the magneto-optical recording film 4 to thereby improve a reproduction CN ratio, a higher reflectance to the reproduction beam will make a better result, and thus the provision of the reflectance of at least 70% or higher to the reproduction beam is more preferable.

Further, when the thermal conductivity of the ferromagnetic reflection film 5 is too low, the magneto-optical recording film 4 is excessively heated when data is recorded or erased, and the repetition thereof causes the disadvantage that the magneto-optical recording film 4 is deteriorated (for example, the amorphous vertically-magnetized film is crystallized, and the like) or the preformat pattern 2 of the transparent substrate 1 is liable to be deformed and thus a reproduction output level is lowered in a short period. On the other hand, when the thermal conductivity of the ferromagnetic reflection film 5 is too high, it is difficult to heat the magneto-optical recording film 4 to the temperature necessary to record or erase data and thus a recording sensitivity is lowered and a recording/reproducing error is increased due to a recorded signal remaining without being erased, which is disadvantageous in that a laser beam source of a large power must be provided.

Figure 2:
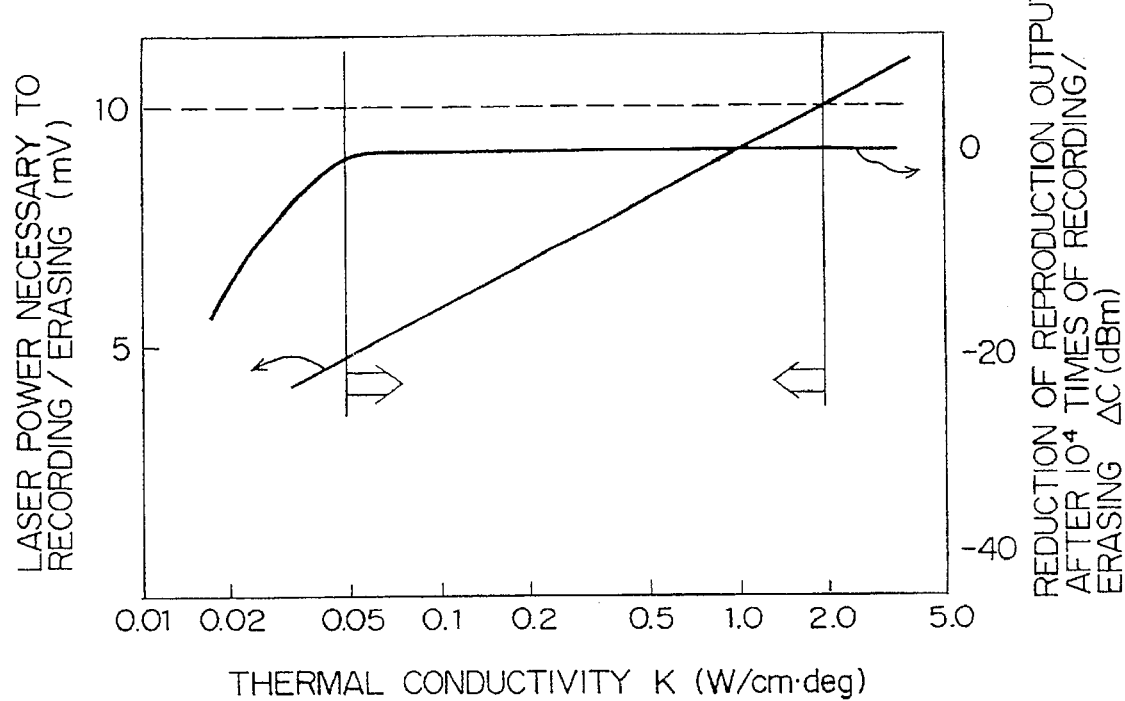
FIG. 2 is a graph showing the effect of a ferromagnetic reflection film in the first embodiment.

FIG. 2 shows the relationship among the thermal conductivity of the ferromagnetic reflection film 5, the reduction of a reproduction output after recording/erasing operations have been repeated $10^4$ times, and the laser power necessary to the recording/erasing operation of data. As apparent from the figure, when a ferromagnetic reflection film having a thermal conductivity of 0.05 W/cm.deg or less is used as the ferromagnetic reflection film 5, a reproduction output is abruptly lowered after the recording/erasing operations have been repeated $10^4$ times and thus it is found that the ferromagnetic reflection film cannot be practically used. Further, when a ferromagnetic reflection film having a thermal conductivity of 2.0 W/cm.deg or higher is used as the ferromagnetic reflection film 5, a laser power of 10 mW or higher (on the film surface) is necessary to record/erase data and thus it is found that the ferromagnetic reflection film is also difficult to be practically used. The thermal conductivity of the ferromagnetic reflection film 5 is determined to the above range from these data.

A specific example of the ferromagnetic reflection film 5 includes an alloy thin film composed of at least one kind of element selected from the group of elements Pt, Al, Ag, Au, Cu, Rh and at least one kind of element selected from the group of elements Fe, Co, Ni. Note, that even if the elements constituting the ferromagnetic reflection film are the same, the magnitude of an external magnetic filed necessary to perfectly erase an already recorded signal varies depending upon the contents thereof.

Figure 3:
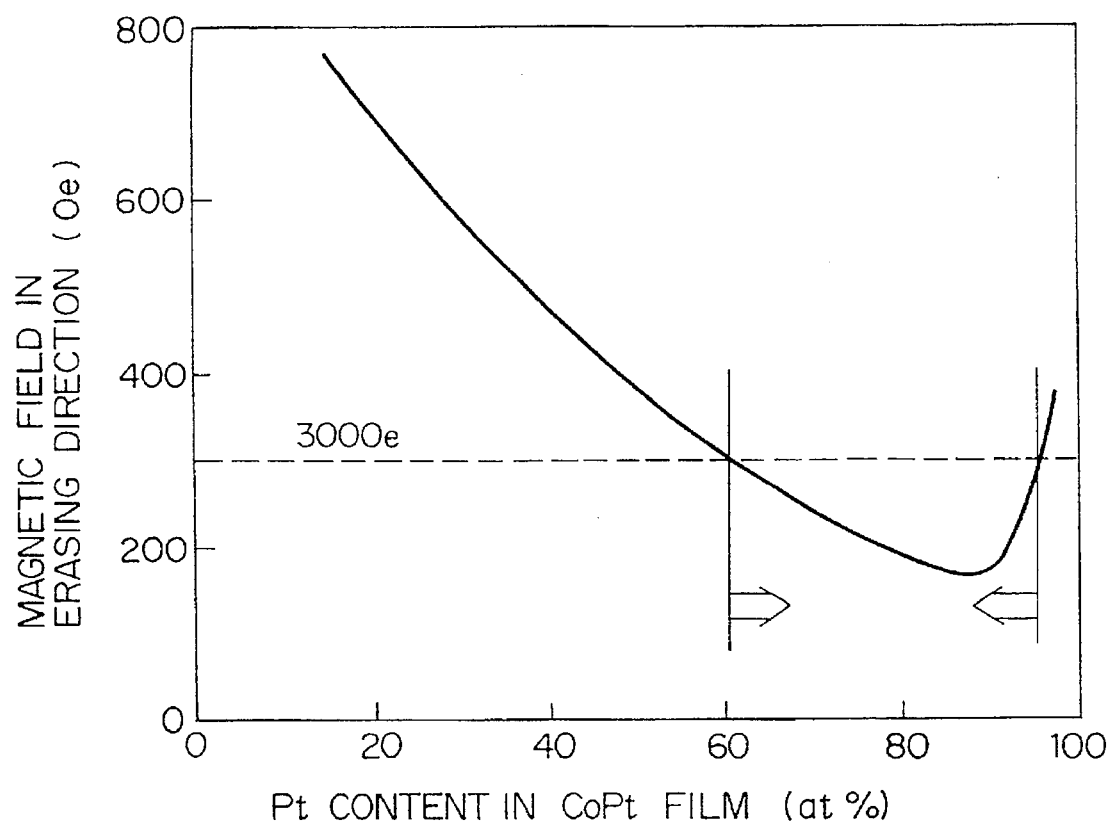
FIG. 3 is a graph showing the relationship between the composition of a PtCo thin film and the magnetic field in an erasing direction in the first embodiment.

FIG. 3 shows the relationship between a Pt content in a thin film and the magnetic field in an erasing direction (film thickness: 200 angstroms), taking a CoPt alloy thin film as an example, where the magnetic field in an erasing direction means a minimum magnetic field in which data cannot be recorded when data is recorded while an external magnetic field is imposed in an erasing direction and approximately represents the magnitude of an external magnetic field necessary to perfectly erase an already recorded signal. As apparent from FIG. 3, the CoPt alloy thin film has the Pt content at which the magnetic field in an erasing direction is minimized. An external magnetic filed which can be provided with a drive is 300 Oe at best by the request from the drive side, and it is found that the Pt content of the CoPt alloy thin film must be adjusted to 60 to 95 at % to perfectly erase an already recorded signal by the external magnetic field.

The protective film 6 is formed from an inorganic dielectric substance similar to that of the above enhanced layer 3 or an organic material such as a photocuring resin or the like. When the inorganic dielectric substance is used as a material for the protective layer, it is formed to a film thickness of from 500 to 2000 angstroms.

More specific experimental examples and comparative examples will be shown below to compare their recording/erasing characteristics.

EXPERIMENTAL EXAMPLE 1

A magneto-optical recording medium shown in FIG. 1 was made in such a manner that a SiN enhanced layer of 850 angstroms, TeFeCo amorphous vertically-magnetized film of 400 angstroms, PtCo ferromagnetic reflection film of 300 angstroms containing 75 at % of Pt and SiN protective layer of 1500 angstroms were sequentially sputtered on the surface where a preformat pattern was formed of an injection molded polycarbonate substrate.

COMPARATIVE EXAMPLE 1

Figure 4:
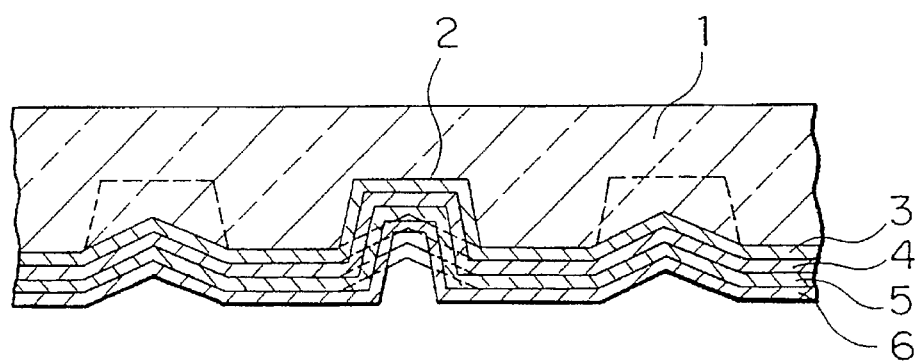
FIG. 4 is a cross sectional view of the main part of a magneto-optical recording medium according to a comparative example.

A magneto-optical recording medium shown in FIG. 4 was made in such a manner that a SiN enhanced layer of 850 angstroms, TeFeCo amorphous vertically-magnetized film of 400 angstroms, SiN protective layer of 200 angstroms and Al alloy reflection layer of 700 angstroms were sequentially sputtered on the surface having a preformat pattern formed thereon of an injection molded polycarbonate substrate.

Figure 5:
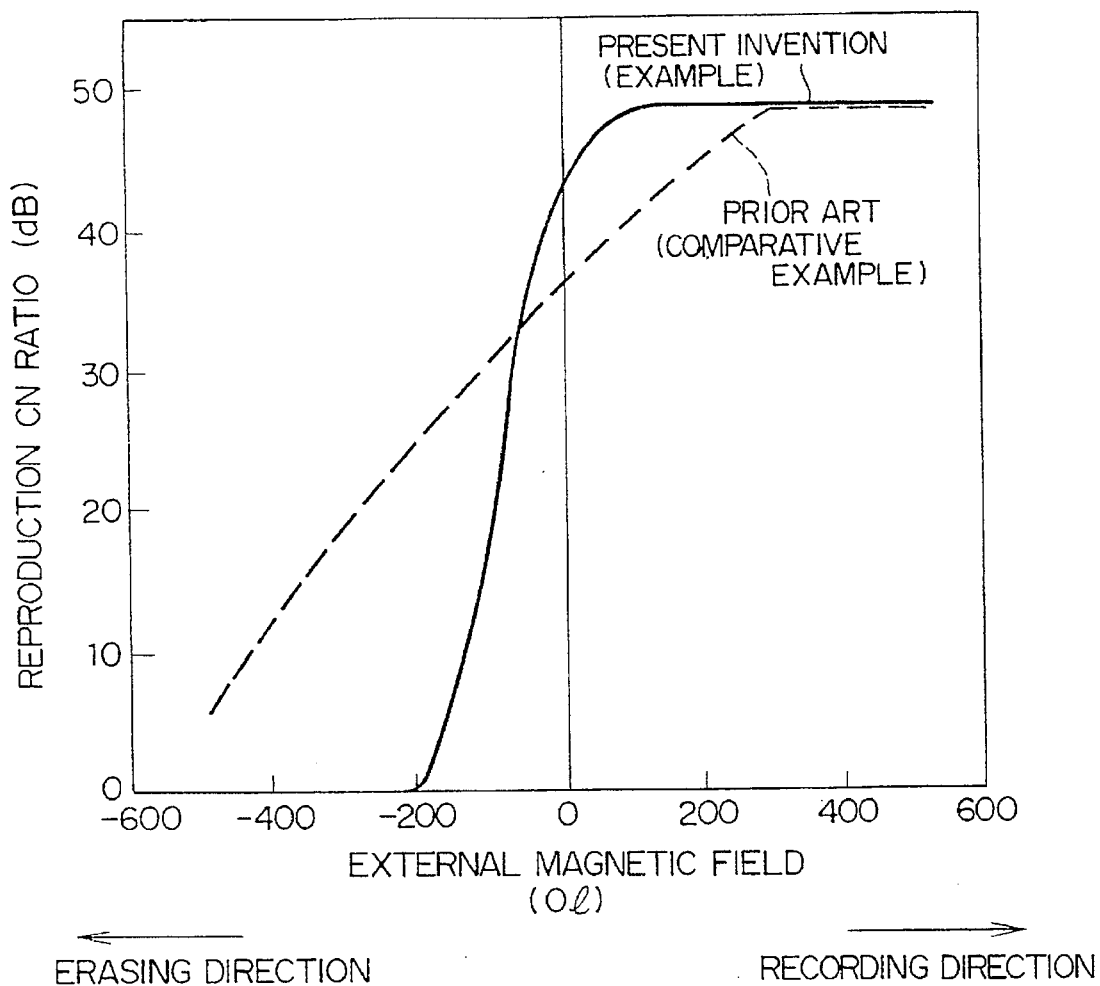
FIG. 5 is a graph comparing the recording/erasing characteristics of the magneto-optical recording medium according to each experimental example and comparative example of the first embodiment.

FIG. 5 shows the recording/erasing characteristics of the magneto-optical recording medium according to Experimental Example 1 and the recording/erasing characteristics of the magneto-optical recording medium according to Comparative Example 1. The recording/erasing characteristics mentioned here refers to the change of a reproduction CN ratio caused when the magnitude and direction of an external magnetic field imposed during recording is changed, and the abscissa in FIG. 5 is the scale of the magnitude and direction of the external magnetic field imposed during recording and the ordinate therein is the scale of the reproduction CN ratio.

As apparent from the figure, in the magneto-optical recording medium of Comparative Example 1, the reproduction CN ratio does not reach a saturated value until an external magnetic field of about 300 Oe is imposed in a recording direction, whereas, in the magneto-optical to-optical recording medium of Experimental Example 1, the reproduction CN ratio reaches a saturated value only by imposing an external magnetic field of about 100 Oe in a recording direction, from which it is found that the magneto-optical recording medium of Experimental Example can perfectly record data with a smaller external magnetic field. Further, the magneto-optical recording medium of Experimental Example 1 cannot make a reproduction CN ratio zero unless an external magnetic field of 600 Oe or more is applied in an erasing direction, whereas the magneto-optical recording medium of Experimental Example 1 can make a reproduction CN ratio zero only by imposing an external magnetic field of about 200 Oe in an erasing direction, from which it is found that the magneto-optical recording medium of Experimental Example 1 can perfectly erase data with a smaller external magnetic field. Therefore, the magneto-optical recording medium of Experimental Example 1 can be said to have recording/erasing characteristics by which overwriting is liable to be carried out by a magnetic field modulation system as compared with the magneto-optical recording medium of Comparative Example 1. In addition, the saturated value of the reproduction CN ratio of the magneto-optical recording medium of Experimental Example 1 is substantially the same as that of Comparative Example 1 and thus it is found that both of them have a sufficiently high CN ratio.

As described above, since the magneto-optical recording medium of the First Example has the ferromagnetic reflection film 5 laminated on the backside of the magneto-optical recording film 4 which has a reflectance to a reproduction beam of 70% or higher and a thermal conductivity at a normal temperature from 0.05 to 2.0 W/cm.deg, the magneto-optical recording medium has the excellent feature that it can record data by overwriting using a magnetic field modulation system, has a high reproduction CN ratio and can preserve data for a long period.

Note that although the enhanced film 3 was interposed between the transparent substrate 1 and the magneto-optical recording film 4 in the first embodiment, it can be omitted when the ferromagnetic reflection film 5 has a higher reflectance and thus a sufficient reproduction CN ratio may be obtained.

Further, although the protective film 6 was provided on the outermost surface of the medium in the First Embodiment, it may be omitted when a substance having excellent corrosion resistance is used as the ferromagnetic reflection film 5.

Further, although the ferromagnetic reflection film 5 was directly laminated on the backside of the magneto-optical recording film 4 in the first example, a second enhanced film composed of an inorganic dielectric substance similar to that of the enhanced film 3 may be interposed between the magneto-optical recording film and the ferromagnetic reflection film 5.

Second Embodiment

Figure 6:
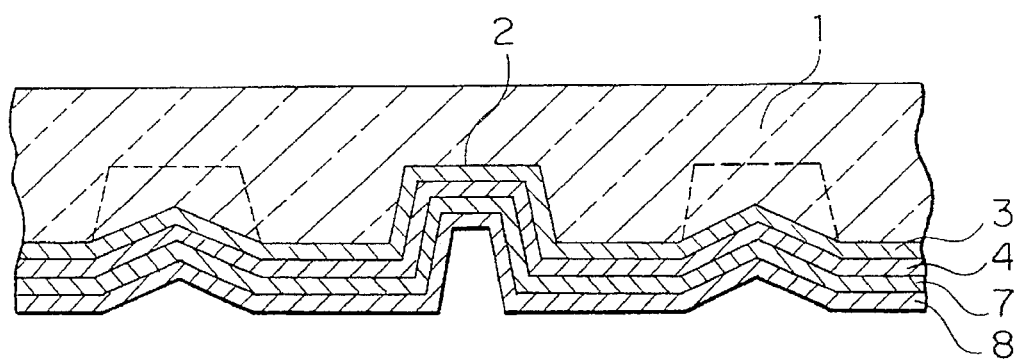
FIG. 6 is a cross sectional view of the main part of a magneto-optical recording medium according to a second embodiment of the present invention.

Second Embodiment of the present invention will be described with reference to FIGS. 6 to 17. FIG. 6 is a cross sectional view of the main part of a magneto-optical recording medium according to Second Embodiment and, as shown in the figure, the magneto-optical recording medium of the example comprises a first enhanced film 3, magneto-optical recording film 4, a second enhanced film 7 and a heat control layer 8 serving as a reflection film and protective film sequentially laminated from a transparent substrate 1 side on the surface thereof where a preformat pattern 2 is formed. Since the transparent substrate 1, preformat pattern 2, first enhanced film 3 and magneto-optical recording film 4 are similar to those of First Embodiment, they are not described.

The heat control layer 8 is composed of an alloy of one kind or more of metal elements selected from the group of Al, Ag, Au, Cu, Be and one kind or more of metal elements selected from the group of Cr, Ti, Ta, Sn, Si, Rb, Pe, Nb, Mo, Li, Mg, W, Zr. In particular, preferably the heat control layer 8 is composed of an AlTi alloy containing 6 to 10 at % of Ti and has a film thickness regulated to the range from 500 to 1000 angstroms.

When a TbFeCo alloy is used as the magneto-optical recording film 4, the film temperature in the region where a laser beam is irradiated must be increased to 200° C. or higher when data is recorded or erased because the Curie point of the alloy having the above composition is about 200° C. When the magneto-optical recording film 4 is reached to the thermal state thereof by a recording laser beam, the center of the portion where the laser beam is irradiated is at the highest temperature in the film. More specifically, for example, as show in FIG. 7, when a recording pit having a predetermined size (e.g., a diameter of 0.8 micrometers) is to be formed, the interior of the diameter must be increased to 200° C. or higher. More specifically the peripheral line of the diameter of 0.8 micrometers is an isothermal line of 200° C. and the interior of the isothermal line is necessarily 200° C. or higher.

Figure 7:
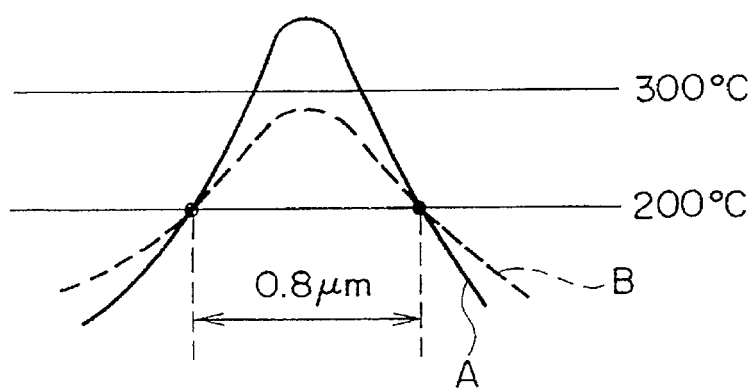
FIG. 7 is a diagram explaining the temperature distribution of the portion where a laser beam is irradiated in the second embodiment.

At this time, a temperature difference is caused at the center of the portion where the laser beam is irradiated by the thermal conductivity of the heat control layer 8. The curves in FIG. 7 schematically show a temperature distribution, wherein a dotted curve B is a characteristic curve when the heat control layer 8 having a relatively good thermal conductivity is used and a solid curve A is a characteristic curve when the heat control layer 8 having a relatively bad thermal conductivity is used. As apparent from the figure, a temperature difference is caused at the center of the portion where the laser beam is irradiated depending upon the difference of the heat conductivity of the heat control layer 8. In other words, the maximum temperature of the magneto-optical recording film 4 can be controlled by the thermoconducting property of the heat control layer 8 (thermal conductivity, film thickness and the like).

When heated to 300° C. or higher, the above magneto-optical recording film 4 is subject to a structural easing and crystallization and the recording/reproducing characteristics thereof are deteriorated, and thus a control must be carried out so that such a phenomenon does not arise.

Figure 8:
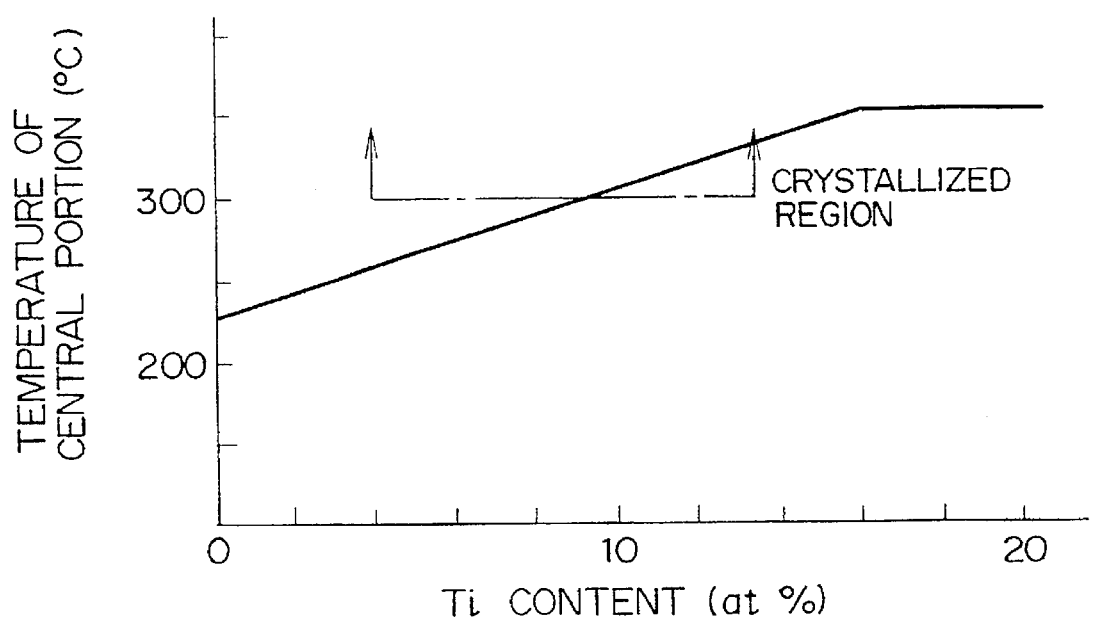
FIG. 8 is a graph showing the relationship between the composition of a heat control layer and the temperature distribution in the portion where a laser beam is irradiated in the second embodiment.

FIG. 8 shows the result of the study of the dependency of the Ti content in the heat control layer upon the maximum temperature of the magneto-optical recording film, the study having been carried out using a TbFeCo alloy as the magneto-optical recording film and an AlTi alloy as the metal protective film, as described above.

The abscissa in FIG. 8 shows the Ti content in the AlTi alloy and the ordinate therein shows the temperature at the center of the portion when a laser beam is irradiated, respectively. Note that the temperature at the center is a temperature when the film surface the temperature of which is 200° C. or higher has a diameter of 1 micron.

As described above, in the case of $Tb_xFe_{(100-X-Y-Z)}Co_YM_Z$ type magneto-optical recording film, since crystallization proceeds and adversely affects recording/reproducing characteristics when the portion where a laser beam is irradiated becomes 300° C. or higher, a temperature must be controlled so that the temperature of the portion is not increased to 300° C. or higher. For this purpose, the Ti content in the AlTi alloy must be regulated to 10 at % or less, as apparent from FIG. 8.

Figure 9:
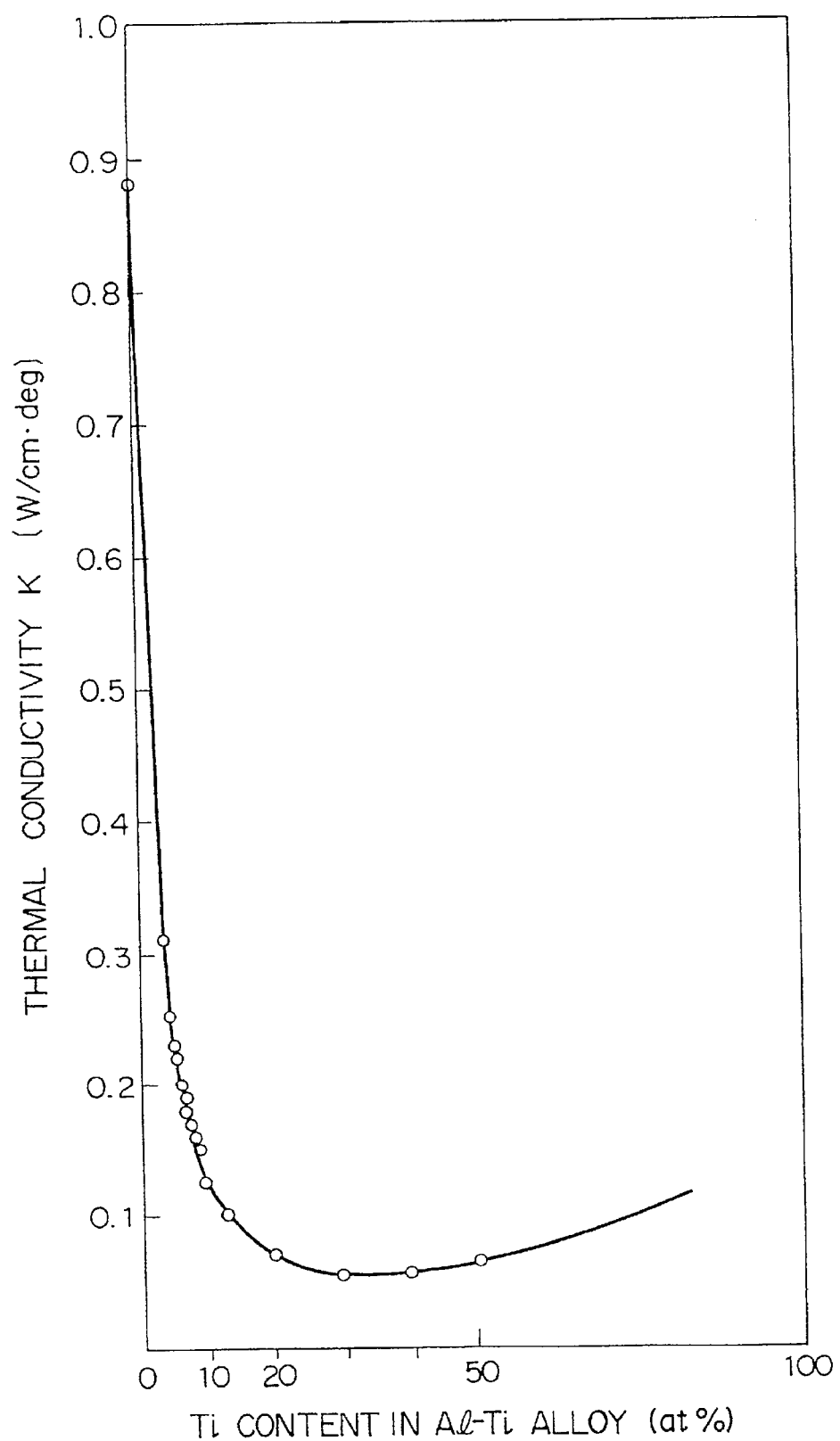
FIG. 9 is a graph showing the relationship between the composition of the heat control layer and the thermal conductivity in the second embodiment.

FIG. 9 is a diagram showing the relationship between the Ti content in the AlTi alloy and the thermal conductivity K thereof at a normal temperature. As apparent from the figure, the thermal conductivity K of the AlTi alloy changes depending upon the Ti content, and when the Ti content is 10 at % or less, the thermal conductivity K is 0.13 W/cm.deg or higher.

It is found from the various experiments carried out by the inventors that the thermal conductivity K of the heat control layer at a normal temperature must be regulated to the range of $2.0 \geq K \geq 0.1$ W/cm.deg. When the thermal conductivity K of the heat control layer exceeds 2.0 W/cm.deg, heat is diffused so quickly that a higher laser power is required to carry out recording and erasing, which is uneconomical. On the other hand, when the thermal conductivity K of the heat control layer is less than 0.1 W/cm.deg, heat is diffused so slowly that the amorphous structure of the recording film is eased and crystallized while recording and erasing are repeatedly carried out. Therefore, the thermal conductivity K of the magneto-optical recording film at a normal temperature must be regulated to the range of $2.0 \geq K \geq 0.1$ W/cm.deg, and in particular the thermal conductivity thereof regulated to the range of $0.25 \geq K \geq 0.14$ W/cm.deg is preferable.

Figure 10:
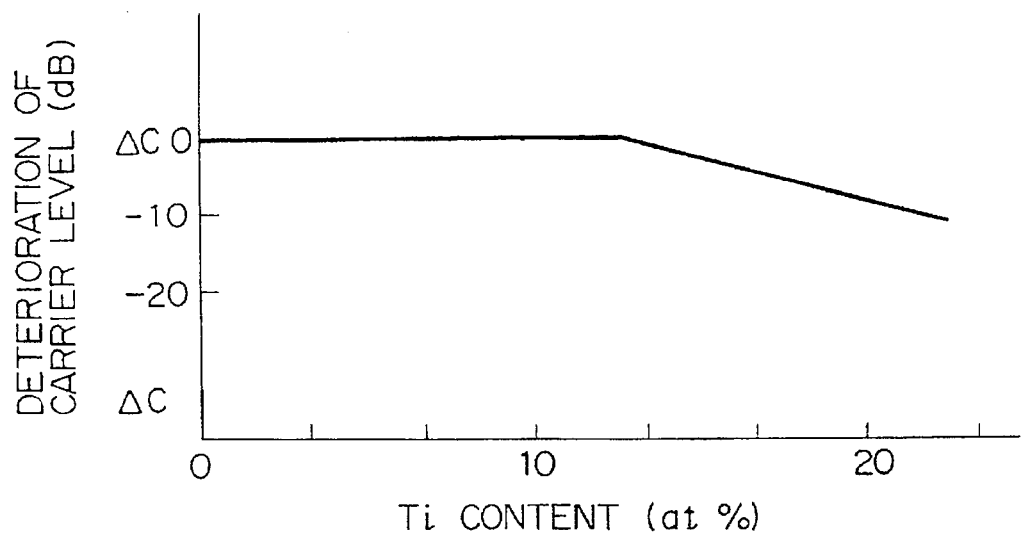
FIG. 10 is a graph showing the relationship between the composition of the heat control layer and the durability against repeated recording and reproduction in the second embodiment.

FIG. 10 is a diagram showing the relationship between the Ti content in the AlTi alloy and the deterioration of a carrier level after a recording/erasing cycle. Note that FIG. 10 shows the deteriorated state of the carrier level of a recorded and then reproduced signal after recording and erasing have been repeated 10,000 times with the above AlTi alloy having a film thickness of 750 angstroms.

As apparent from the figure, when the Ti content in the AlTi alloy a little exceeds 10 at %, the carrier level is deteriorated, which is supposed to exhibit that the amorphous structure of the recording film is eased and the crystallization thereof proceeds.

Usually, the thickness of each film on the substrate in the magneto-optical recording medium is as follows.

first enhancement film 600–1000 Å
magneto-optical recording film 200–500 Å
second enhancement film 0–400 Å

In the case of the thus arranged magneto-optical recording medium, a laser power necessary in a recording/erasing process can be controlled by adjusting the above heat control layer.

Figure 15:
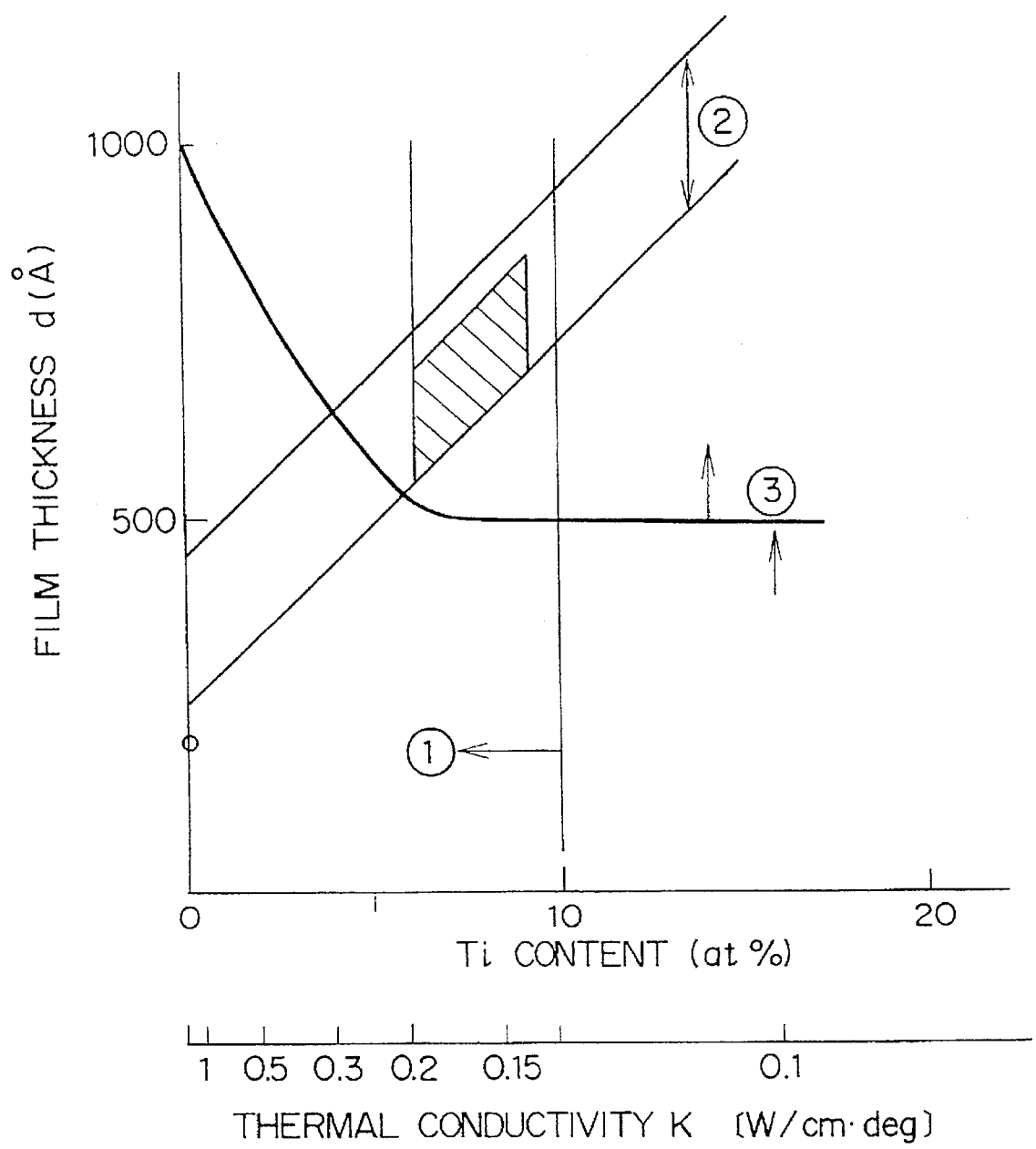
FIG. 15 is a graph showing the relationship among the composition, thermal conductivity and film thickness of the heat control layer in the second embodiment.

To record and erase data by a laser power having a film surface reaching power of 5 to 10 mW [when a magneto-optical disk of 5 inches is rotated at 2400 rpm (linear speed of 7.5 to 15 m/sec)] and to reproduce data by a laser power of 1 to 3 mW, the film thickness of the heat control layer and the Ti content in the AlTi alloy must be in the region (2) in FIG. 15. When data is erased at a linear speed of 15 m/sec at the region above the upper limit of this region (2), a laser power of 10 mW or higher is needed (when track offset margin is taken into consideration). Further, when a signal is reproduced by a laser power of 1 to 3 mW at the region below the lower limit of the region (2), there is a danger that data may be destroyed.

Further, the above heat control layer serves to protect the recording film and the effect thereof is different depending upon the composition and film thickness of the heat control layer. The composition and film thickness of the AlTi alloy having an error rate of $1 \times 10^{-6}$ or less for 1000 hours under the circumference of 80° C. and 90% RH are located in the region (3) in FIG. 15. It is confirmed that the region where the AlTi alloy has the Ti content of 6 at % provides a stable protection effect when the heat control layer has the film thickness of 500 angstroms. This is due to the corrosion resistant effect achieved by Ti, and when the Ti content is less than 6 at %, the corrosion resistant effect is not always sufficient. Therefore, the Ti content in the AlTi alloy and the film thickness thereof must be regulated to 6 at % or higher and 500 angstroms or more, respectively.

From the mentioned above, a magneto-optical recording medium excellent in the durability to a recording/reproducing cycle, recording/erasing/reproducing power characteristics and protection effect to a recording film can be provided by regulating the Ti content in the AlTi alloy to 6 to 10 at % and the film thickness thereof to 500 angstroms or more.

Figure 11:
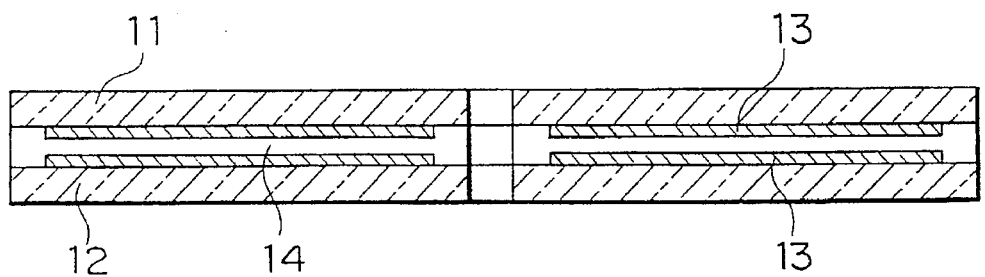
FIG. 11 is a cross sectional view showing a specific structure of the magneto-optical recording medium in the second embodiment.
Figure 12:
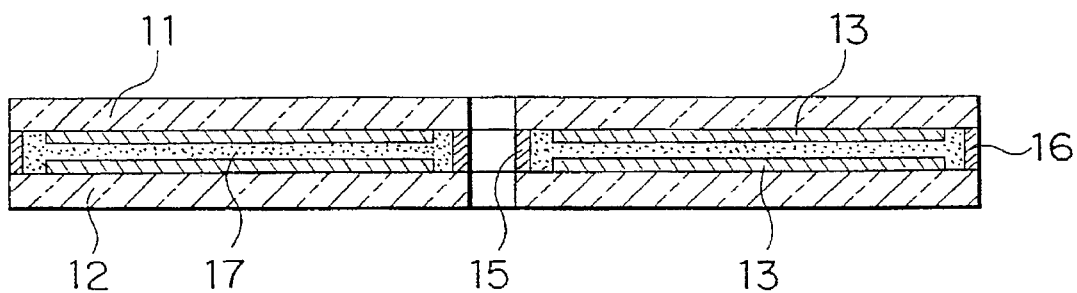
FIG. 12 is a cross sectional view showing a specific structure of the magneto-optical recording medium in the second embodiment.

FIGS. 11 and 12 show specific examples of the present invention. More specifically, FIG. 11 shows a closely adhered type magneto-optical recording medium and FIG. 12 shows an air sandwich type magneto-optical recording medium, comprising designates a recording disks 11 and 12 a laminated film 13 having the respective films 3 to 6 shown in FIG. 6, an adhesive layer 14, an inner circumference spacer 15, an outer circumference spacer 16, and air gap 17.

Although the heat control layer composed of the AlTi alloy is described in the above example, a heat control layer, which is composed of an alloy of at least one kind of a metal element selected from the group of Al, Ag, Au, Cu, Be and at least one kind of a metal element selected from the group of Cr, Ti, Ta, Sn, Si, Rb, Pt, Nb, Mo, Mg, W, Zr and has a thermal conductivity of $0.1 < K < 2.0$, can provide an effect similar to that of the above example.

Next, the performances of the respective specific examples will be compared as follows.

EXPERIMENTAL EXAMPLE 2 first enhancement film (SiN) 800 Å magneto-optical recording film (TbFeCo alloy) 400 Å second enhancement film (SiN) 200 Å heat control layer (AlTi alloy containing 7 at % of Ti) 750 Å

EXPERIMENTAL EXAMPLE 3 first enhancement film (SiN) 800 Å magneto-optical recording film (TbFeCo alloy) 400 Å second enhancement film (SiN) 200 Å heat control layer (AlTi alloy containing 10 at % of Ti) 750 Å

EXPERIMENTAL EXAMPLE 4 first enhancement film (SiN) 800 Å magneto-optical recording film (TbFeCo alloy) 400 Å second enhancement film (SiN) 200 Å heat control layer (AlTi alloy containing 12 at % of Ti) 750 Å

Figure 16:
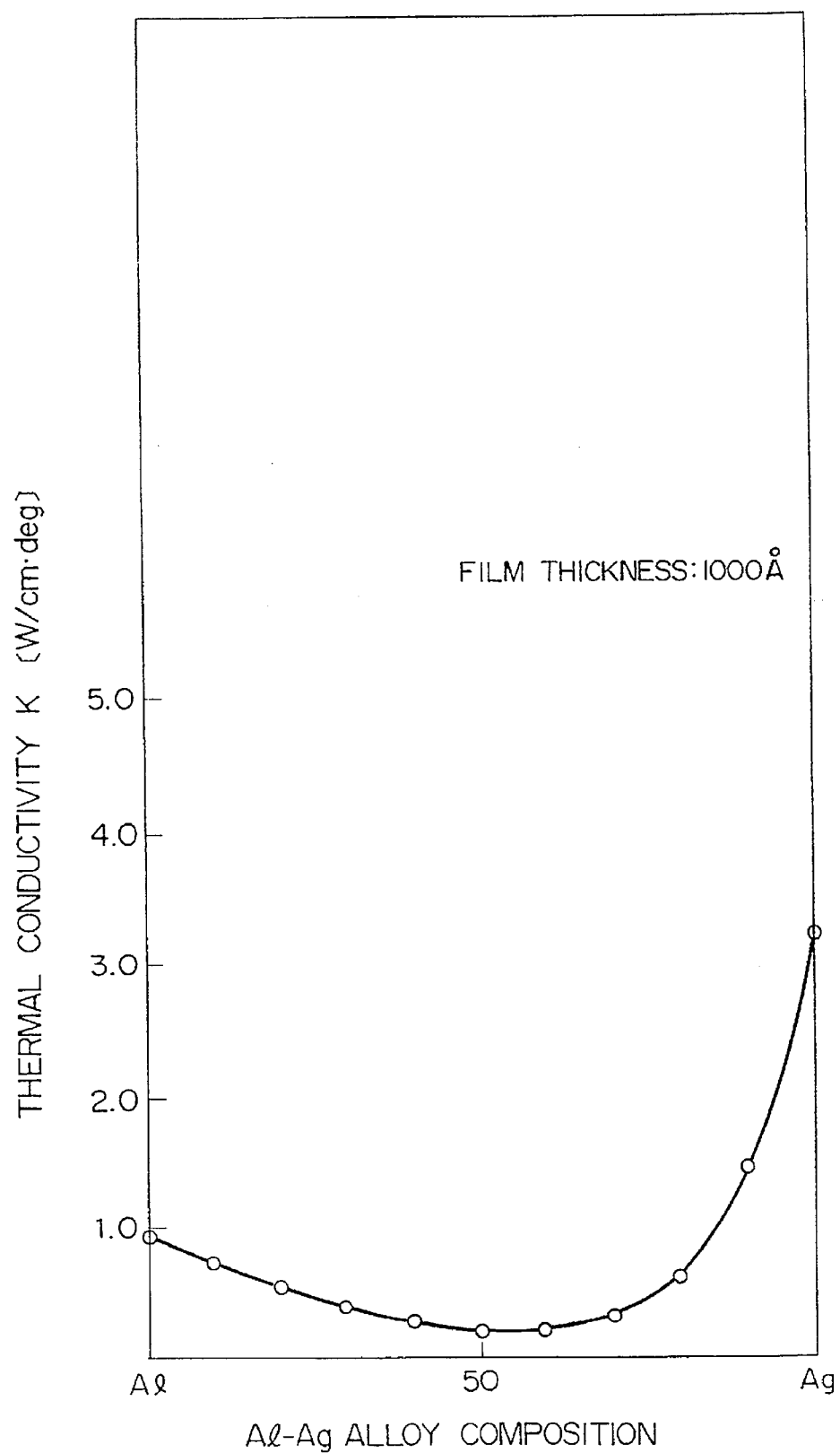
FIG. 16 is a graph showing the relationship between the composition and thermal conductivity of the heat control layer in the second embodiment.
Figure 17:
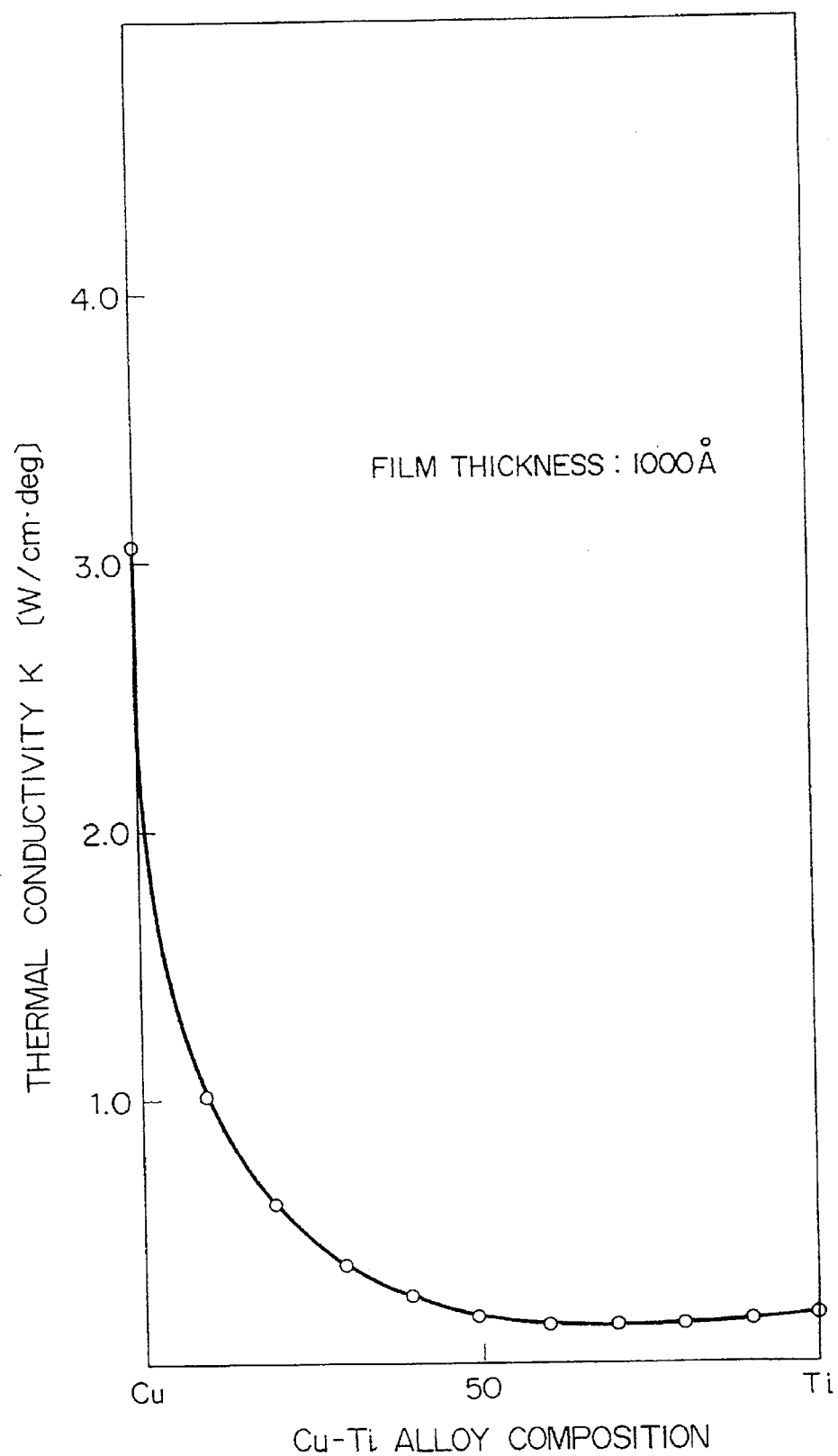
FIG. 17 is a graph showing the relationship between the composition of the heat control layer and the thermal conductivity in the second embodiment.

FIG. 16 is a characteristic diagram showing the relationship between an AlAg alloy composition to which the present invention can be applied and the thermal conductivity of the alloy and further FIG. 17 is a characteristic diagram showing the relationship between a CuTi alloy composition and the thermal conductivity of the alloy.

A similar effect can be provided by using these AlAg alloy and CuTi alloy as the heat control layer and regulating the range of the thermal conductivity thereof.

Figure 13:
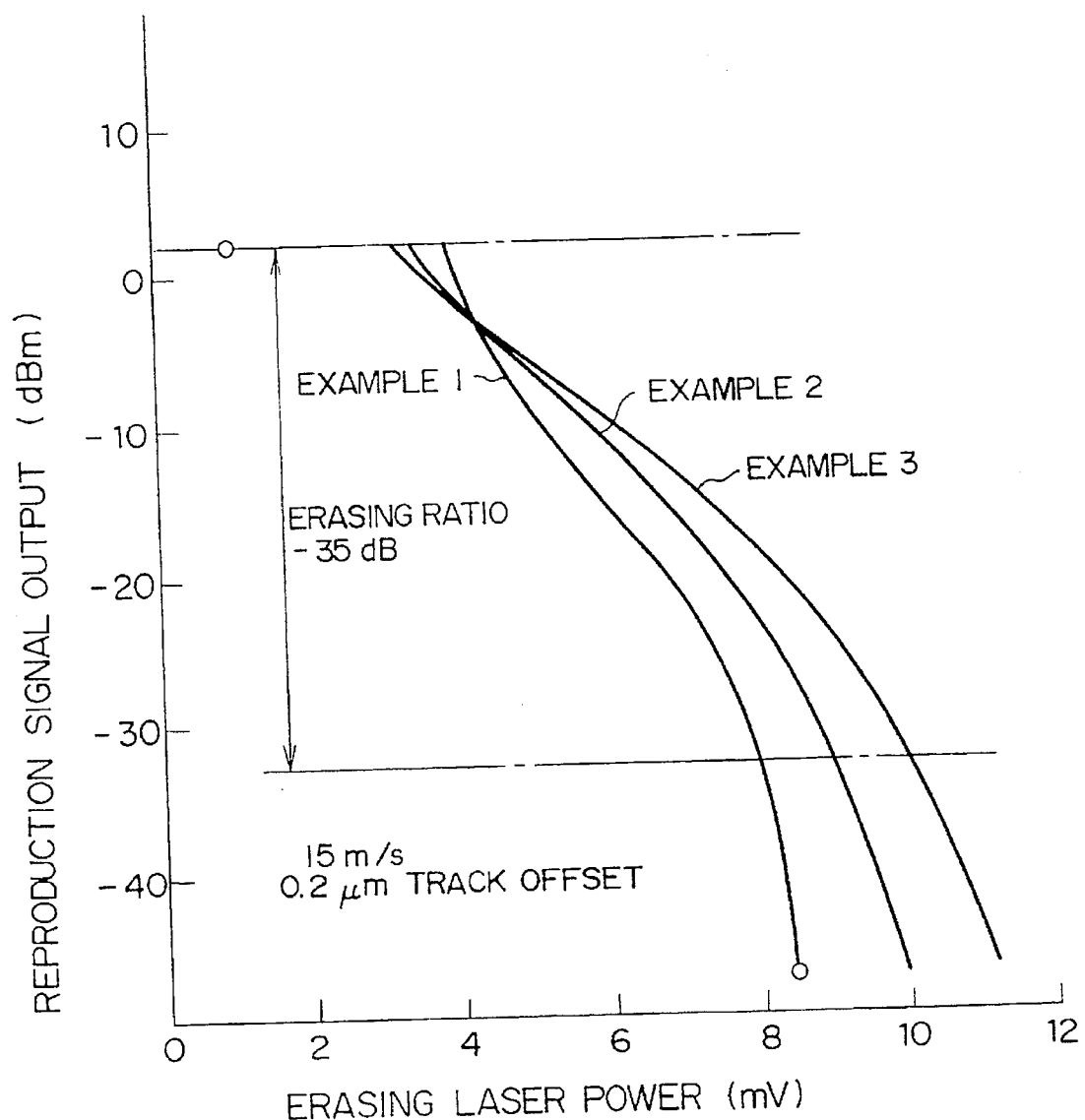
FIG. 13 is a characteristic diagram of a reproduction signal output of the magneto-optical recording medium according to each experimental example in the second embodiment.

FIG. 13 shows the erasing characteristics of the magneto-optical recording medium in Experimental Examples 2 to 4. As is apparent from the figure, the magneto-optical disks in Experimental Examples 2 to 4 sufficiently operate with a low laser power.

Figure 14:
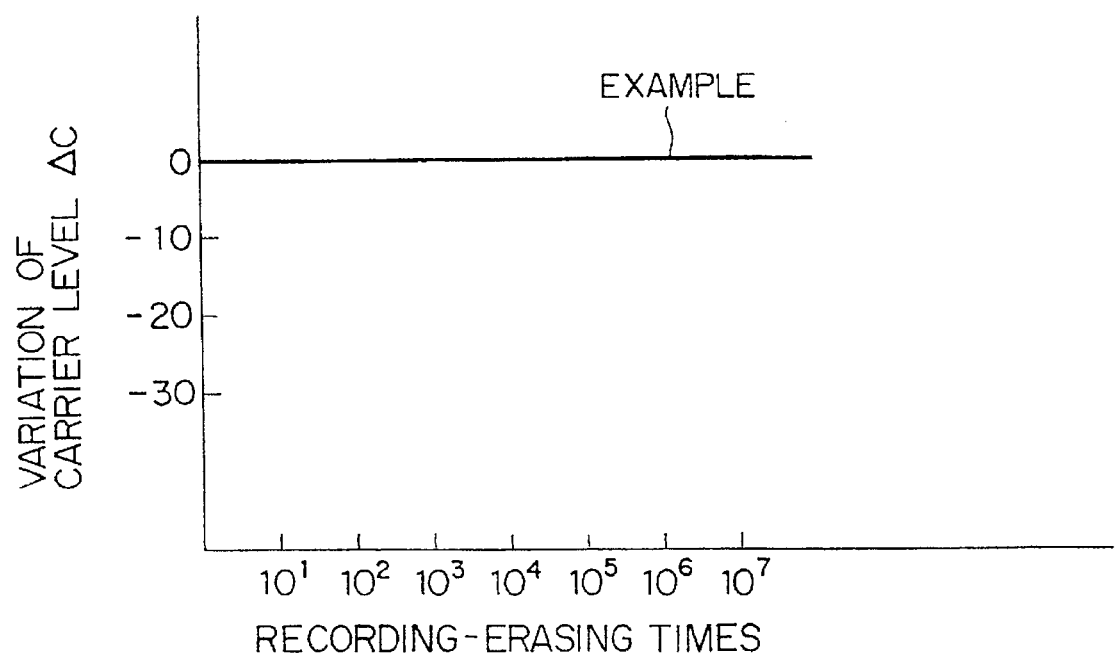
FIG. 14 is a graph showing the durability against repeated recording and reproduction of the magneto-optical recording medium according to the second embodiment.

FIG. 14 is a characteristic diagram of the carrier level of the magneto-optical disk in Experimental Example 2. As apparent from the figure, the magneto-optical disk of the present invention little damps a signal even if recording and erasing are repeated many times so that a highly reliable magneto-optical recording medium can be provided.

Third Embodiment

Third Embodiment of the present invention will be described with reference to FIGS. 18 to 24. The magneto-optical recording medium of Third Embodiment is characterized in that the sensitivity of the external magnetic field of a magneto-optical recording film is improved by changing the composition of the magneto-optical recording film in First and Second Embodiments. Therefore, the portion of Third Embodiment except the magneto-optical recording film is not described because it is similar to that of First and Second Embodiments.

The magneto-optical recording film of the Third Embodiment is composed of a rare earth metal-transition metal type amorphous vertically-magnetized film containing any one of N or O or both thereof in a total amount of 0.1 to 5.0 at % and formed to a film thickness of 200 to 500 angstroms. More specifically, although N and O mixed into a magneto-optical recording film are conventionally recognized as an impurity and a technical study has been carried out to prevent N and O from being mixed into the magneto-optical recording film, the inventors have found that there is a proper range of a mixing ratio of N and O within which they can lower only a vertical magnetic anisotropic energy without lowering a Kerr rotation angle, as a result of the study of the relationship between the mixing ratio of N or O mixed into a rare earth metal-transition metal type amorphous vertically-magnetized film and a residual Kerr rotation angle, the relationship between the above mixing ratio and a vertical magnetic anisotropic constant, the relationship between the above mixing ratio and a CN ratio, and the like. According to the study of the inventors, when N and/or O are mixed into a rare earth metal-transition metal type amorphous vertically-magnetized film within the range from 0.1 to 5.0 at %, only a vertical magnetic anisotropic energy can be lowered without lowering a Kerr rotation angle, so that the sensitivity of the external magnetic field of a magneto-optical recording film can be increased. The mixing ratio of N, O in the magneto-optical recording film of the present invention is determined based on this knowledge. Although any arbitrary known composition may be used as the rare earth metal-transition metal type amorphous vertically-magnetized film, a ternary alloy containing rare earth (e.g., Tb, Gd, Nd, Dy), transition metal (e.g., Fe, Co, Ni) and additive element (e.g., Cr, Ti, Nb) is particularly preferable.

Methods of forming the magneto-optical recording film will be described below.

(1) After a first enhancement film has been formed on a transparent substrate and then a rare earth metal-transition metal type amorphous vertically-magnetized film has been formed by a suitable method, the above amorphous vertically-magnetized film is heated in a vacuum vessel the degree of vacuum in which is adjusted to $1.0\times10^{-5}$ to $1.0\times10^{-3}$ Pa for 5 to 90 minutes at 20 to 120° C. to nitride or oxidize the amorphous vertically-magnetized film to provide a desired magneto-optical recording film.

(2) After a first enhancement film has been formed on a transparent substrate, a rare earth metal-transition metal type amorphous vertically-magnetized film is formed in an atmosphere containing N or O or a mixed gas of N and O having a partial pressure of 0.1 to 5.0%, and in this process the rare earth metal-transition metal type amorphous vertically-magnetized film is nitrogenized or oxidized to provide a desired magneto-optical recording film.

Methods of making the atmosphere containing N or O or a mixed gas of N and O having the partial pressure of 0.1 to 5.0% mentioned in the above (2) are as follows:

(i) After a vacuum vessel has been evacuated to the degree of high vacuum of the order of $10^{-5}$ Pa, N or O or a mixed gas of N and O is supplied to the vacuum vessel and the partial pressure of the N or O or the mixed gas of N and O in the vacuum vessel, in which a film forming process is being carried out, is adjusted to 0.1 to 5.0% and (ii) The degree of vacuum in a vacuum vessel is evacuated to $1.0\times10^{-4}$ to $5.0\times10^{-4}$ Pa to cause air having a partial pressure from 0.1 to 5.0% to remain in the vacuum vessel prior to the formation of a rare earth metal-transition metal type amorphous vertically-magnetized film.

Note, that any arbitrary vacuum film forming method such as sputtering, ion plating, vacuum vapor deposition, and the like may be applied as a method of forming the rare earth metal-transition metal type amorphous vertically-magnetized film.

Figure 18:
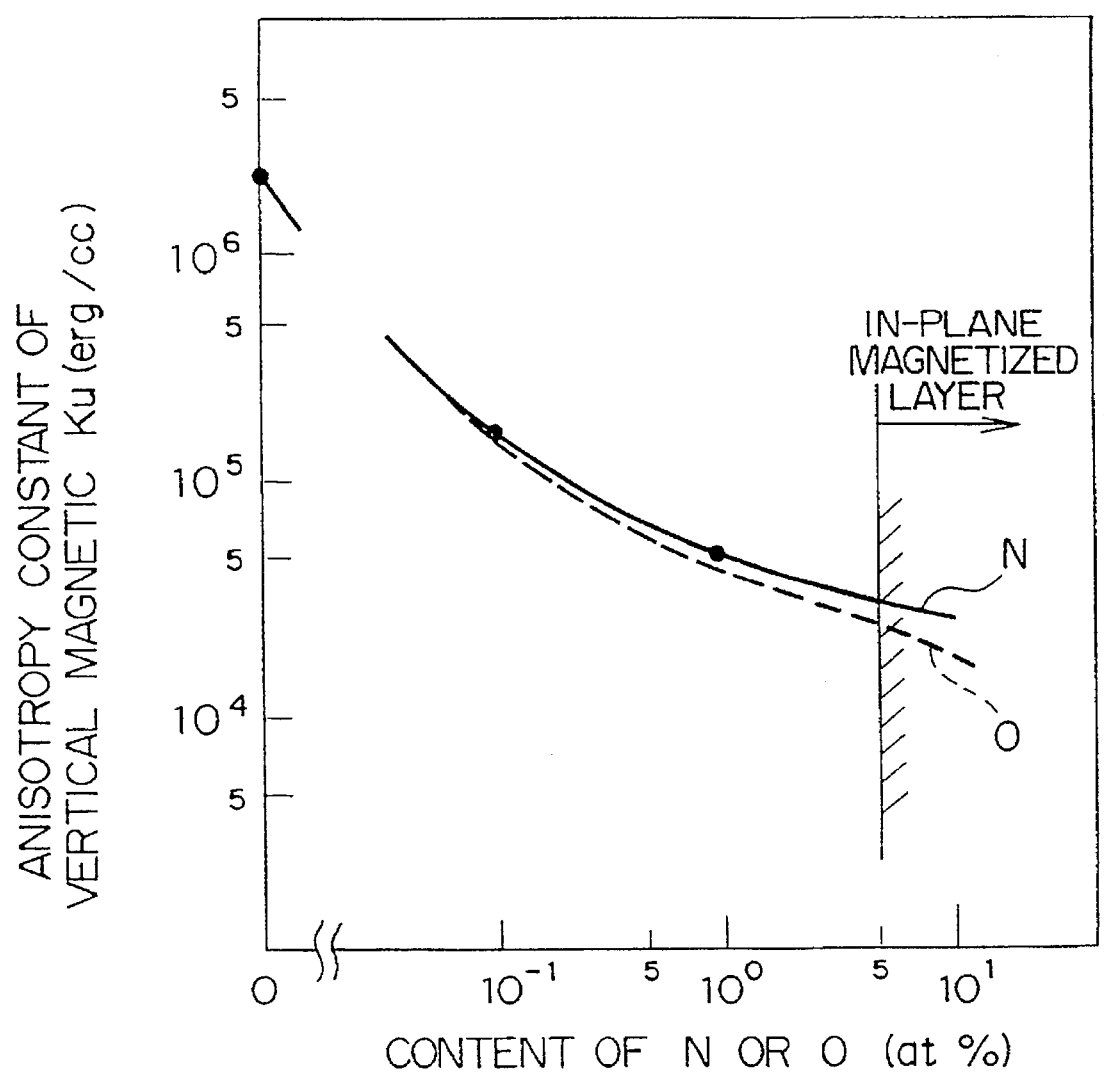
FIG. 18 is a graph showing the relationship between the ratios of N and O mixed with the magneto-optical recording film and the vertical magnetic anisotropy in a third embodiment of the present invention.
Figure 19:
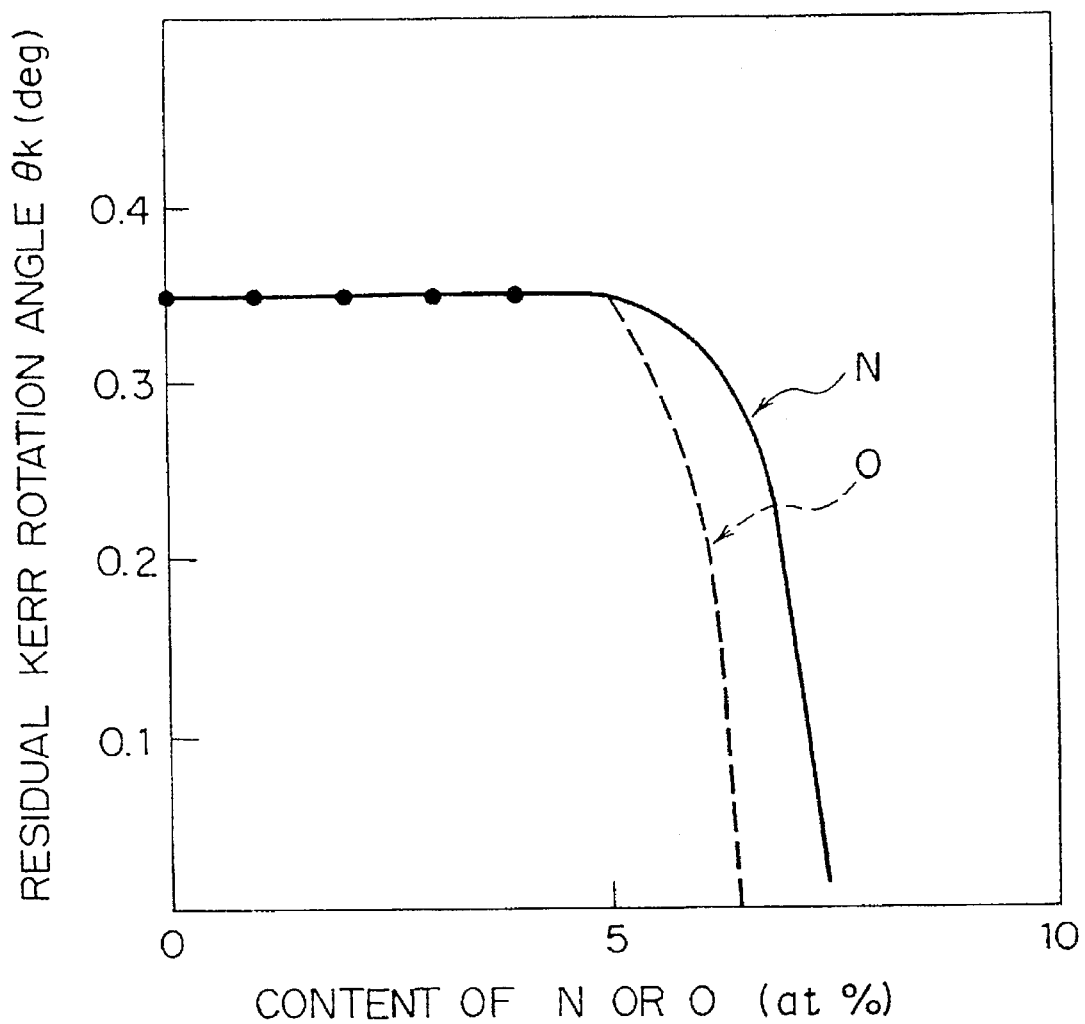
FIG. 19 is a graph showing the relationship between the ratios of N and O mixed to the magneto-optical recording film and the residual Kerr rotation angle in the third embodiment.

FIG. 18 shows the relationship between the mixing ratios of N and O in the magneto-optical recording film 4 and the vertical magnetic anisotropic constant thereof and FIG. 19 shows the relationship between the mixing ratios of N and O in the magneto-optical recording film 4 and the residual Kerr rotation angle thereof.

As shown in FIG. 18, the vertical magnetic anisotropic constant Ku of the magneto-optical recording film sensitively decreases when N or O is mixed and, as the mixing ratio of N or O increases, it gradually decreases. Then, when the mixing ratio of N or O exceeds 5.0 at %, the vertical magnetic anisotropic constant Ku is below a demagnetizing field and a magnetic moment tends to incline to an in-plane.

On the other hand, the residual Kerr rotation angle is relatively stable to the mixing of N and O and not almost reduced when N and O are mixed in the mixing ratio from 0 to 5.0 at %. When the mixing ratio exceeds 5.0 at %, the residual Kerr rotation angle abruptly decreases, which is caused by the disappearance of vertical anisotropy found in FIG. 18. Note that the degree of decrease of the residual is caused more abruptly when the mixing ratio of O is increased rather than when the mixing ratio of N is increased.

It is found from FIGS. 18 and 19 that the size of an external magnetic field necessary to record and erase data can be reduced without reducing a signal output level by adjusting the mixing ratios of N and O in the magneto-optical film to 0 to 5.0 at %.

Figure 21:
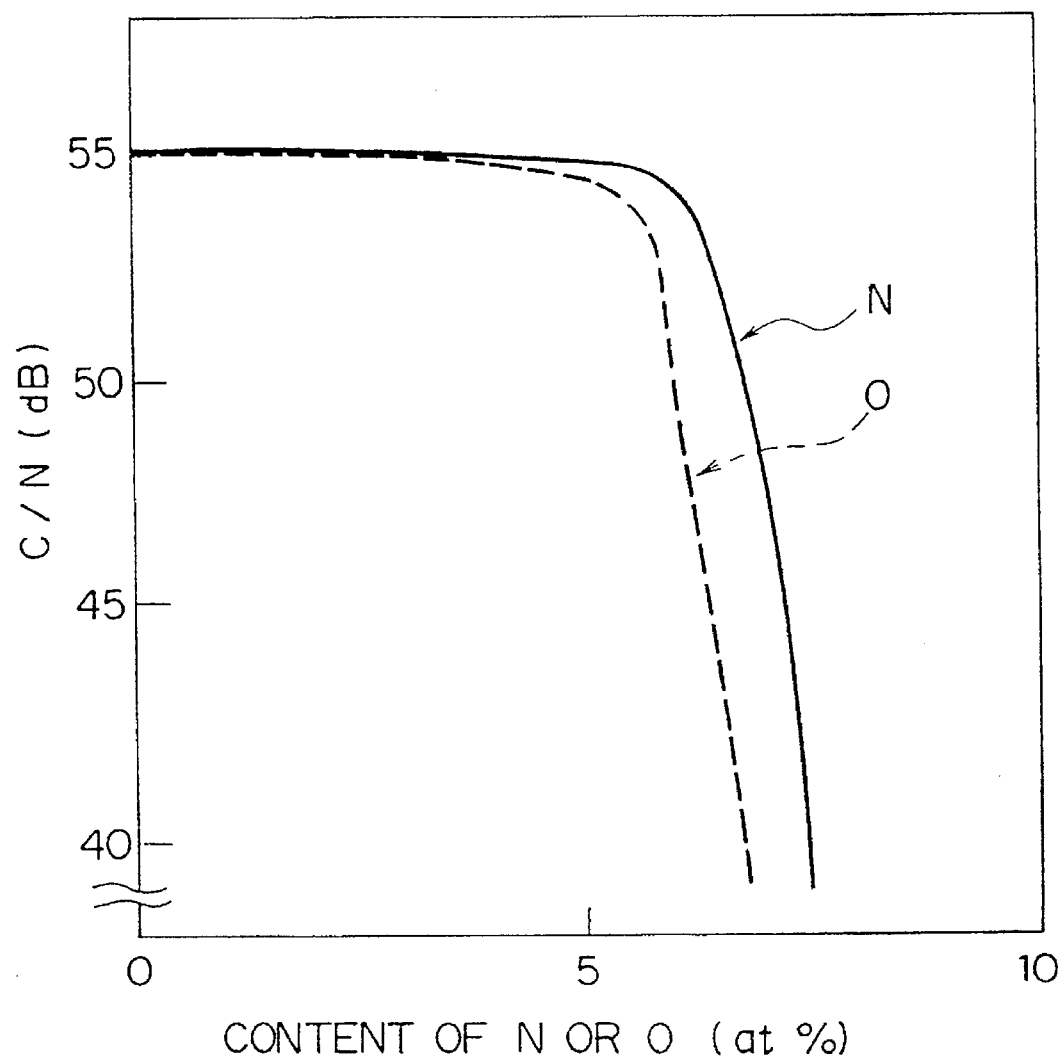
FIG. 21 is a graph showing the relationship between the mixing ratios of N and O measured by using the magneto-optical recording medium shown in FIG. 20 and a reproduction CN ratio.
Figure 22:
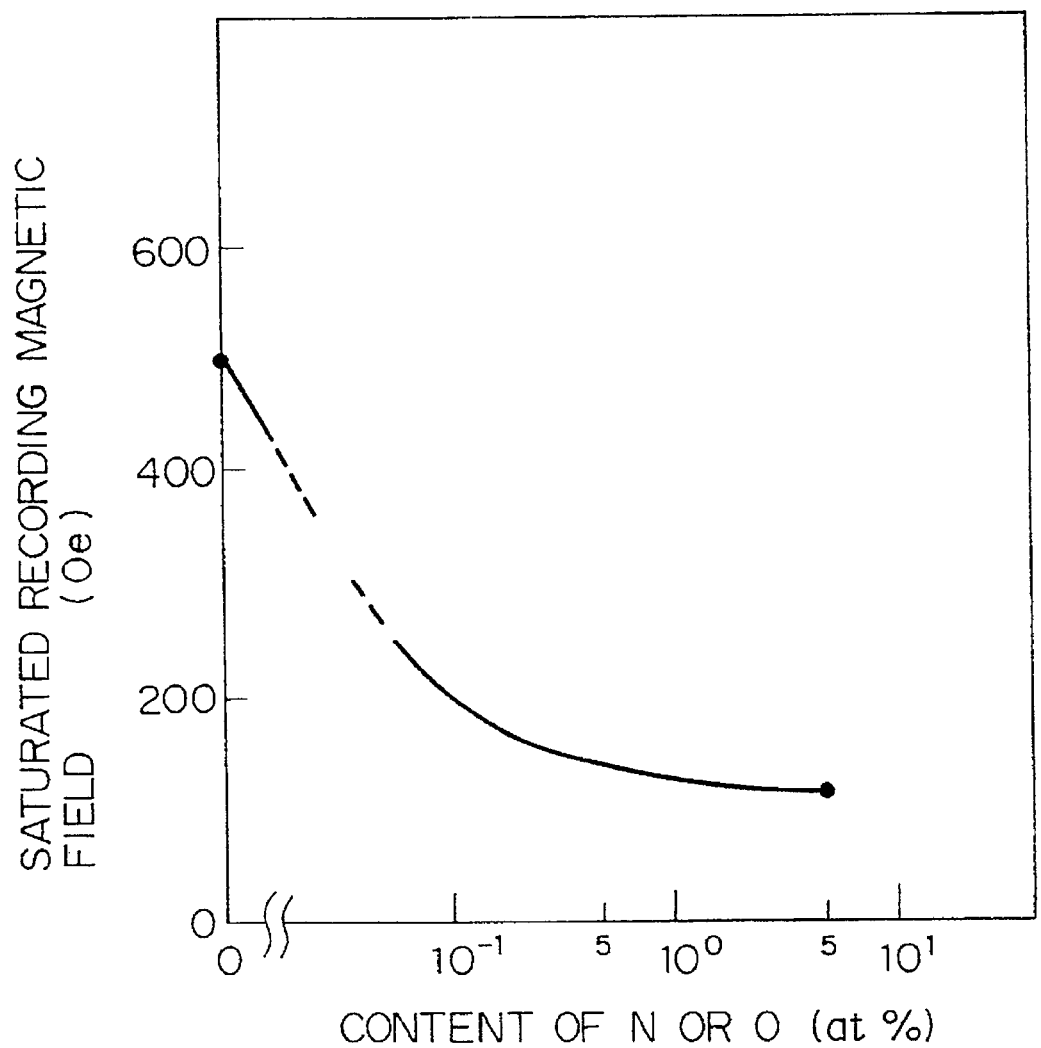
FIG. 22 is a graph showing the relationship between the mixing ratios of N and O measured by using the magneto-optical recording medium shown in FIG. 20 and a saturated magnetic field.
Figure 23:
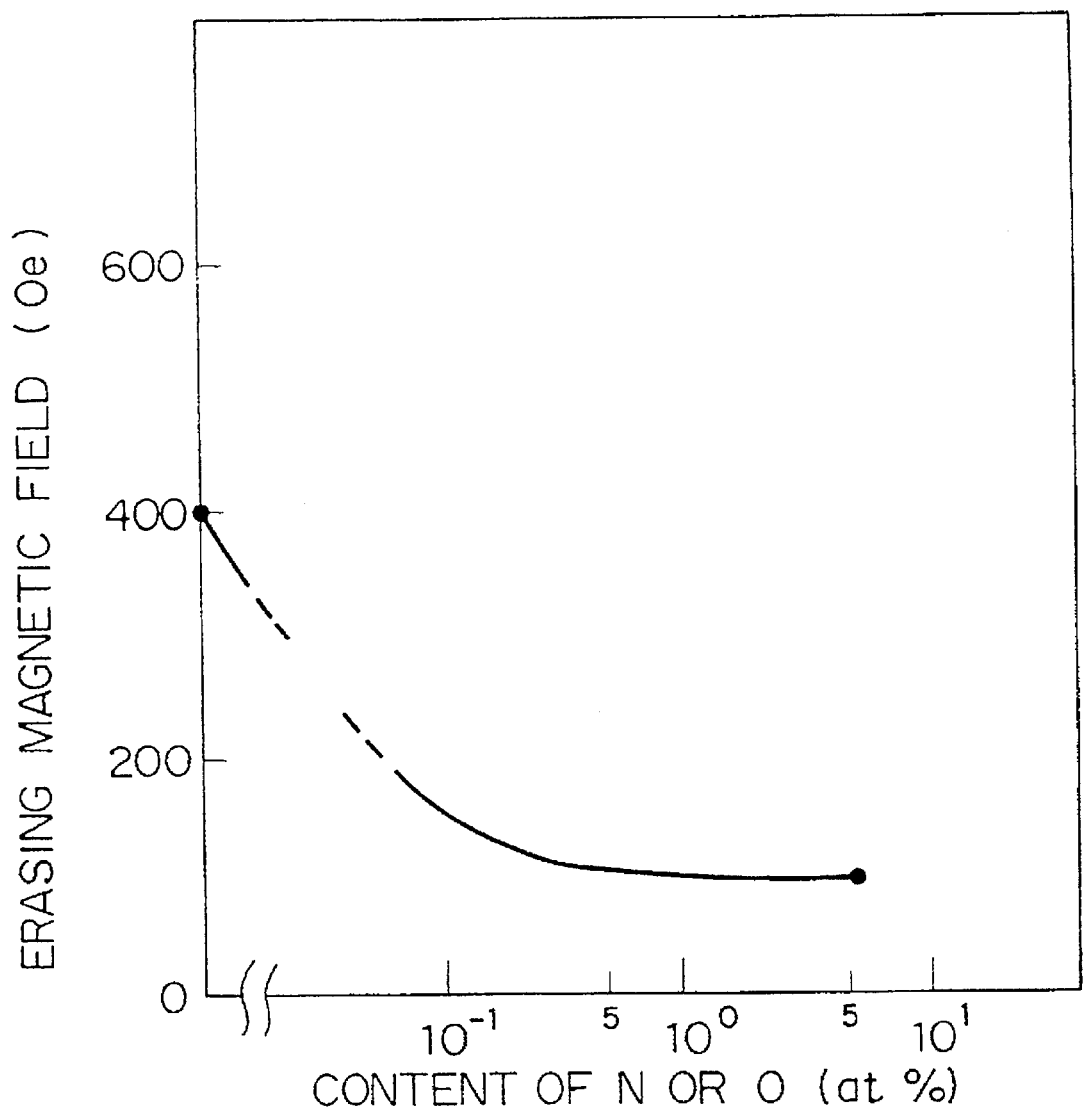
FIG. 23 is a graph showing the relationship between the mixing ratios of N and O measured by using the magneto-optical recording medium shown in FIG. 20 and an erasing magnetic field.

FIGS. 21, 22 and 23 show the relationship between the mixing ratios of N and O, and the reproduction CN ratio, saturated recording magnetic field, and the magnitude of an external magnetic field where an erasing ratio is −40 dB, i.e., erasing magnetic field, wherein a disk shaped magneto-optical recording medium having the film structure shown in FIG. 20 is used as a specimen.

As shown in FIG. 21, with respect to the relationship between the mixing ratio of N and the reproduction CN ratio, the reproduction CN ratio is not almost changed even if the mixing ratio is changed in the range from 0 to 5.0 at %, but the reproduction CN ratio gradually decreases when the mixing ratio exceeds 5.0 at % and it abruptly decreases when the mixing ratio exceeds 6.0 at %. On the other hand, with respect to the relationship between the mixing ratio of O and the reproduction CN ratio, the reproduction CN ratio is not almost changed even if the mixing ratio is changed in the range from 0 to 3.5 at %, but the reproduction CN ratio gradually decreases when the mixing ratio exceeds 3.5 at % and it abruptly decreases when the mixing ratio exceeds 5.5 at %.

As shown in FIG. 22, the saturated recording magnetic field, i.e., the minimum magnetic field, in which a carrier and noise reach the level obtained when a sufficiently large external magnetic field is applied, exhibits the same tendency both when the mixing ratio of N is changed and when the mixing ratio of O is changed. And, as the mixing ratio of N increases or as the mixing ratio of O increases, the saturated recording magnetic field can be lowered, and when 0.1 at % or more of N or O is mixed, the saturated recording magnetic field can be made to 200 Oe or lower. Note that, as shown in ISO Standard, since a target at the present is to make the saturated recording magnetic field to 225 Oe or less, this target can be cleared by making the mixing ratio of N or O to 0.1 at % or higher.

Further, as shown in FIG. 23, the erasing magnetic field (in this example, referred to as an erasing ratio, i.e., the external magnetic field in which a noise level after erasing with respect to a carrier level becomes −40 dB when data is recorded) exhibits the same tendency both when the mixing ratio of N is changed and when the mixing ratio of O is changed. And, as the mixing ratio of N increases or as the mixing ratio of O is increases, the erasing magnetic field can be lowered, and when 0.1 at % or more of N or O is mixed, the erasing magnetic field can be made to 200 Oe or lower.

As described above, the data shown in FIGS. 21, 22 and 23 correspond to the data shown in FIGS. 18 and 19.

The reproduction CN ratio, saturated recording magnetic field, erasing magnetic field and mixing ratios of N and O of the magneto-optical film of respective examples will be shown below with reference to the following experimental examples and comparative examples.

EXPERIMENTAL EXAMPLE 5

After AlSiON had been sputtered to a thickness of 800 angstroms as a first enhancement film on the surface having a preformat pattern formed thereon of a polycarbonate substrate using a target in an air gas component, a vacuum vessel containing the air gas component in which the substrate was accommodated was evacuated to $5\times10^{-5}$ Pa, then a pure Ar was supplied into the vacuum vessel as a sputtering gas and the gas pressure in the vacuum vessel was adjusted to a predetermined value, and then a TbFeCo film was sputtered to a thickness of 250 angstroms under the gas pressure condition.

After the formation of the TbFeCo film, the vacuum vessel was evacuated again to $5\times10^{-5}$ Pa and the above TbFeCo film was heated therein at 80° C. for 15 minutes.

After the TbFeCo film had been heated, AlSiON was sputtered thereon to a thickness of 800 angstroms as a second enhancement film and further AlCr was sputtered to a thickness of 750 angstroms as a heat diffusion film on the AlSiON film to provide a disk shaped magneto-optical recording medium.

EXPERIMENTAL EXAMPLE 6

After AlSiON had been sputtered to a thickness of 800 angstroms as a first enhancement film on the surface having a preformat pattern formed thereon of a polycarbonate substrate, a vacuum vessel in which the substrate was accommodated was evacuated to $2\times10^{-5}$ Pa, then a mixed gas containing 99 at % of Ar and 1 at % of N was supplied into the vacuum vessel as a sputtering gas and the gas pressure in the vacuum vessel was adjusted to a predetermined value, and then a TbFeCo film was sputtered to a thickness of 250 angstroms under the gas pressure condition.

After the formation of the TbFeCo film, a second enhancement film and heat diffusion film were immediately formed on the TbFeCo film without carrying out a heat treatment to provide a disk shaped magneto-optical recording medium. The composition, film thickness, film forming method of the second enhancement film and heat diffusion film were similar to those of Experimental Example 5.

EXPERIMENTAL EXAMPLE 7

After AlSiON had been sputtered to a thickness of 800 angstroms as a first enhancement film on the surface having a preformat pattern formed thereon of a polycarbonate substrate, a vacuum vessel in which the substrate was accommodated was evacuated to $2\times10^{-4}$ Pa, then a pure Ar was supplied into the vacuum vessel as a sputtering gas and the gas pressure in the vacuum vessel was adjusted to a predetermined value, and then a TbFeCo film was sputtered to a thickness of 250 angstroms under the gas pressure condition.

After the formation of the TbFeCo film, the degree of vacuum in the vacuum vessel was adjusted to $3\times10^{-4}$ to $5\times10^{-5}$ Pa and the above TbFeCo film was left therein for 30 minutes. The temperature of the TbFeCo film at this time was 40° C.

After the TbFeCo film had been left, a second enhancement film and heat diffusion film were formed on the TbFeCo film to provide a disk shaped magneto-optical recording medium. The composition, film thickness, film forming method of the second enhancement film and heat diffusion film were similar to those of Experimental Example 5.

EXPERIMENTAL EXAMPLE 8

After AlSiON had been sputtered to a thickness of 800 angstroms as a first enhancement film on the surface having a preformat pattern formed thereon of a polycarbonate substrate, a vacuum vessel in which the substrate was accommodated was evacuated to $2\times10^{-5}$ Pa, then a mixed gas containing 99.5 at % of Ar and 0.5 at % of N was supplied into the vacuum vessel as a sputtering gas and the gas pressure in the vacuum vessel was adjusted to a predetermined value, and then a TbFeCo film was sputtered to a thickness of 250 angstroms under the gas pressure condition.

After the formation of the TbFeCo film, a second enhancement film and heat diffusion film were immediately formed on the TbFeCo film without carrying out a heat treatment to provide a disk shaped magneto-optical recording medium. The composition, film thickness, film forming method of the second enhancement film and heat diffusion film were similar to those of Experimental Example 5.

EXPERIMENTAL EXAMPLE 9

After AlSiON had been sputtered to a thickness of 800 angstroms as a first enhancement film on the surface having a preformat pattern formed thereon of a polycarbonate substrate, a vacuum vessel in which the substrate was accommodated was evacuated to $2\times10^{-5}$ Pa, then a mixed gas containing 99.5 at % of Ar, 0.4 at % of N and 0.1 at % of O was supplied into the vacuum vessel as a sputtering gas and the gas pressure in the vacuum vessel was adjusted to a predetermined value, and then a TbFeCo film was sputtered on the above AlSiON film to a thickness of 250 angstroms under the gas pressure condition.

After the formation of the TbFeCo film, a second enhancement film and heat diffusion film were immediately and sequentially laminated on the TbFeCo film without carrying out a heat treatment to provide a disk shaped magneto-optical recording medium. The composition, film thickness, film forming method of the second enhancement film and heat diffusion film were similar to those of Experimental Example 5.

COMPARATIVE EXAMPLE 2

After AlSiON had been sputtered to a thickness of 800 angstroms as a first enhancement film on the surface having a preformat pattern formed thereon of a polycarbonate substrate, a vacuum vessel in which the substrate was accommodated was evacuated to $4\times10^{-5}$ Pa, then a pure Ar was supplied into the vacuum vessel as a sputtering gas and the gas pressure in the vacuum vessel was adjusted to a predetermined value, and then a TbFeCo film was sputtered on the above AlSiON film to a thickness of 250 angstroms under the gas pressure condition.

After the formation of the TbFeCo film, a second enhancement film and heat diffusion film were immediately and sequentially laminated on the TbFeCo film without carrying out a heat treatment to provide a disk shaped magneto-optical recording medium. The composition, film thickness, film forming method of the second enhancement film and heat diffusion film were similar to those of Experimental Example 5.

FIG. 24 shows the outline of the methods of manufacturing the magneto-optical recording medium according to Experimental Examples 5 to 9 and Comparative Example 2, the reproduction CN ratio, saturated recording magnetic field and erasing magnetic field of the magneto-optical film made by each method, and mixing ratios of N and O in the magneto-optical recording medium.

As apparent from the figure, the reproduction CN ratio of the magneto-optical recording medium of Experimental Examples 5 to 9 is approximately similar to that of Comparative Example 2 (prior art), whereas the saturated magnetic field of the magneto-optical recording median of Experimental Examples 5 to 9 is lowered to about 50% of that of the prior art and the erasing magnetic field there is lowered to 40% of that of the prior art. Consequently, the size and weight of the external magnetic field necessary to record and erase data can be reduced, a magnet power supply can be simplified, a power consumption can be reduced, the size of a recording/reproducing unit can be reduced, and further a recording and erasing operation can be carried out at a higher speed. In addition, from the view point of the medium, a large change in distance between the external magnetic field and the magneto-optical recording medium and a large variation of the magnetic field caused by heating can be accepted, which makes the magneto-optical recording medium very reliable.

Note that although Third Embodiment is described, taking as an example the magneto-optical recording medium having the first enhancement film, magneto-optical recording film, second enhancement film, and heat diffusion film laminated on the surface of the substrate where the preformat pattern has been formed, the gist of the present invention is not limited to this example but applicable to a magneto-optical recording medium having any arbitrary film structure as long as it has at least a magneto-optical film.

Fourth Embodiment

Figure 25:
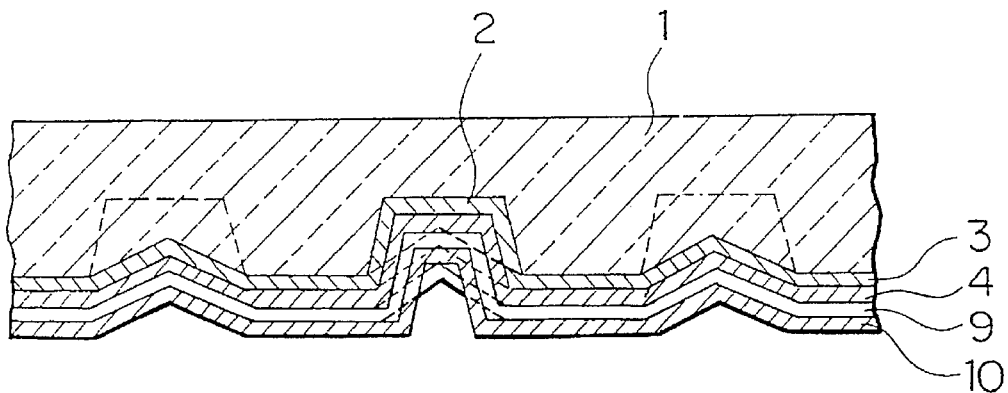
FIG. 25 is a cross sectional view of the main part of the magneto-optical recording medium according to a fourth embodiment of the present invention.

Fourth Embodiment of the present invention will be described with reference to FIGS. 25 to 30. The magneto-optical recording medium of Fourth Embodiment is characterized in that the sensitivity of the external magnetic field of a magneto-optical film is improved by modifying the composition of the magneto-optical film in First and Second Embodiments. FIG. 25 is a cross sectional view of the main part of the magneto-optical recording medium according to Fourth Embodiment, and as Shown in the figure, the magneto-optical recording medium of this example has an enhancement film 3, magneto-optical recording film 4, auxiliary magnetic film 9, and protective film 10 sequentially laminated on the surface having a preformat pattern 2 formed thereon of a transparent substrate 1 from a transparent substrate side. Note that since the transparent substrate 1, preformat pattern 2, enhancement film 3, and magneto-optical recording film 4 are not described, because they are similar to those of First Embodiment. Further, a reflection film may be laminated on the protective film 10, as necessary.

The above auxiliary magnetic film 9 is composed of, for example, an alloy of a noble metal (Au, Pt, Ag, Cu, Rh, Pd, etc.) and a transition metal (Fe, Co, Ni, Mn, Cr etc.), and more specifically, an alloy such as a PtCo alloy, AgCo alloy, PtFe alloy, AgFe alloy, etc., a ferromagnetic substance such as an AlCo alloy, AlFe alloy, etc., various ferrites such as $Fe_3O_4$, a ferrimagnetic substance such as iron garnet, chromite, rare earth metal-transition metal alloy, etc., or a mixture of these magnetic metals and the oxide or nitride thereof, and the Curie temperature thereof has a difference of 150° C. or lower to that of the above magneto-optical recording film 4. Note that the auxiliary magnetic film 9 has a film thickness of 20 to 1000 angstroms and preferably 300 to 500 angstroms.

Further, the auxiliary magnetic film 9 may be positioned on the substrate side or the opposite side thereof with respect to the above magneto-optical recording film 4 or the intermediate location thereof.

When the auxiliary magnetic film 7, which has the Curie temperature difference of 150° C. or less to that of the above magneto-optical recording film 4, is formed in contact with the above magneto-optical recording film 4, a magnetic interaction is produced between the magneto-optical recording film 4 and the auxiliary magnetic film 7, which enables data (recording domain) to be perfectly recorded and erased by a small external magnetic field and thus a data signal can be overwritten by an external magnetic filed modulation system.

Figure 27:
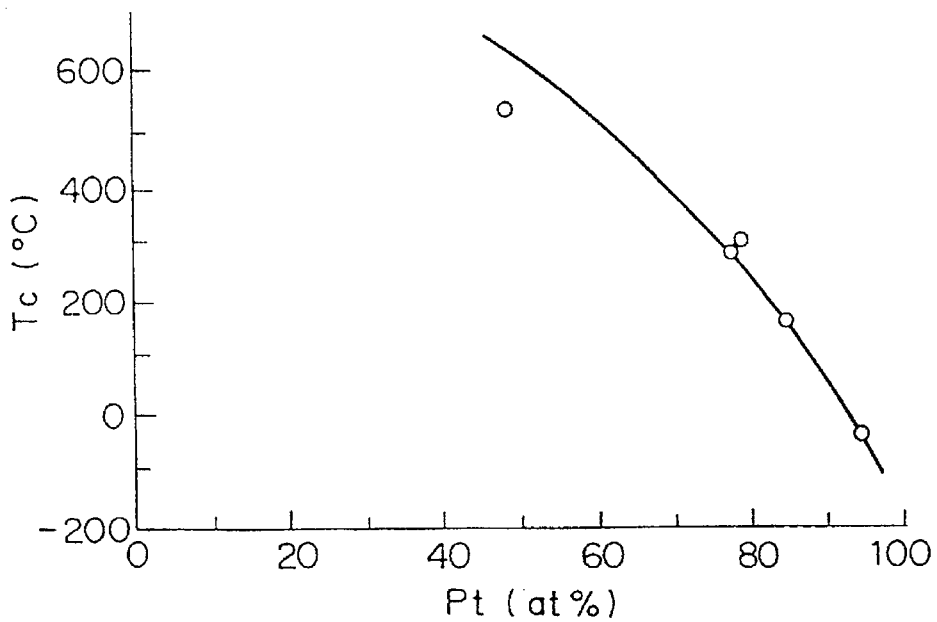
FIG. 27 is a graph showing the relationship between the composition and Curie temperature of the auxiliary magnetic film in the fourth embodiment.

FIG. 27 is a characteristic diagram showing the relationship between the content of Pt in a CoPt alloy film and the Curie temperature (Tc) of the alloy film. As shown in the figure, the Curie temperature Tc of the alloy film can be arbitrarily changed by adjusting the content of Pt.

Figure 26:
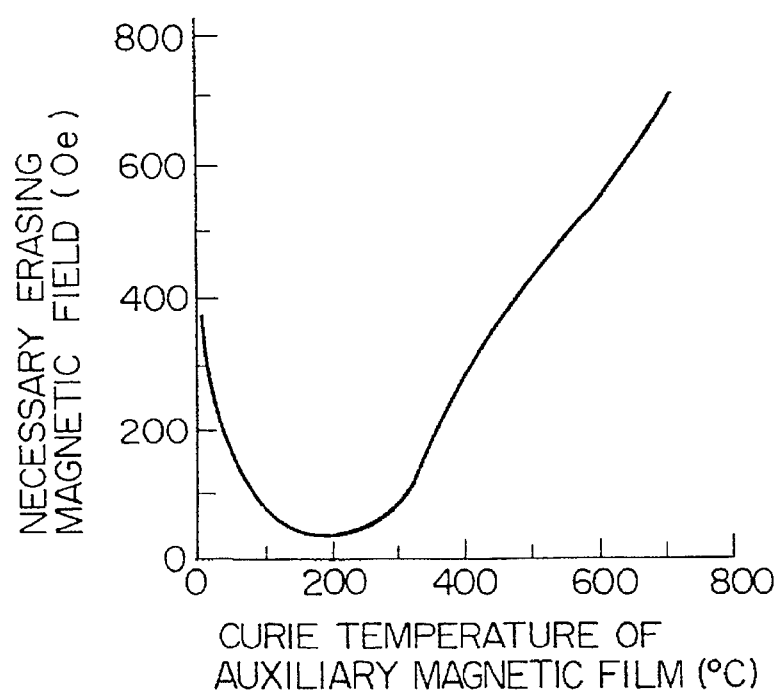
FIG. 26 is a graph showing the relationship between the Curie temperature and the necessary erasing magnetic field of the auxiliary magnetic film in the fourth embodiment.

FIG. 26 is a characteristic diagram showing the relationship between the Curie temperature of the auxiliary magnetic film 9 and the necessary erasing magnetic field.

More specifically, a TbFeCo alloy film having a thickness of 300 angstroms was formed as the magneto-optical recording film 4 and a CoPt alloy film having a thickness of 500 angstroms was formed thereon as the auxiliary magnetic film 9. Then, the Curie temperature of the auxiliary magnetic film 9 was changed in the range from 10° to 600° C. by changing the alloy composition ratio thereof. At this time, the Curie temperature of the magneto-optical recording film 4 was set to 200° C.

Data was recorded by using the magneto-optical recording medium while imposing an external magnetic field in an erasing direction and the minimum intensity of a magnetic field capable of recording data was measured and used as a necessary erasing magnetic field. The erasing magnetic field corresponds to the magnitude of the external magnetic field necessary to perfectly erase a recorded signal.

When data is overwritten by the magnetic field modulation system, an external magnetic field which can be mounted on a recording/reproducing unit is preferably limited to about 200 Oe at the best to satisfy the request from the recording/reproducing unit. As apparent from FIG. 26, when the Curie temperature exceeds 350° C., the external magnetic field is shut off, and when the Curie temperature is less than 50° C., a magnetic interaction is not almost produced between the magneto-optical recording film 4 and the auxiliary magnetic film 9. AS a result, the necessary erasing magnetic field exceeds 200 Oe and cannot be practically used.

On the contrary, when the auxiliary magnetic film 9 which is in direct contact with the magneto-optical recording film 4 and has the Curie temperature in the range from 50° to 350° C. is formed, data can be perfectly erased by a small external magnetic field of 200 Oe or less. In particular, it is found that when the Curie temperature of the auxiliary magnetic film 9 is regulated to the range from 100° to 300° C., data can be perfectly erased by an external magnetic field of 100 Oe or less.

When a TbFeCo alloy containing 23 wt % of Tb, 66 wt % of Fe and 11 wt % of Co is used as the magneto-optical recording film 4 and a PtCo alloy containing 80 wt % of Pt and 20 wt % of Co is used as the auxiliary magnetic film 9, the Curie temperature of the magneto-optical recording film 4 is 200° C. and the Curie temperature of the auxiliary magnetic film 9 is 180° C., so that the temperature difference between the magneto-optical recording film 4 and the auxiliary magnetic film 9 is 20° C.

Figure 28:
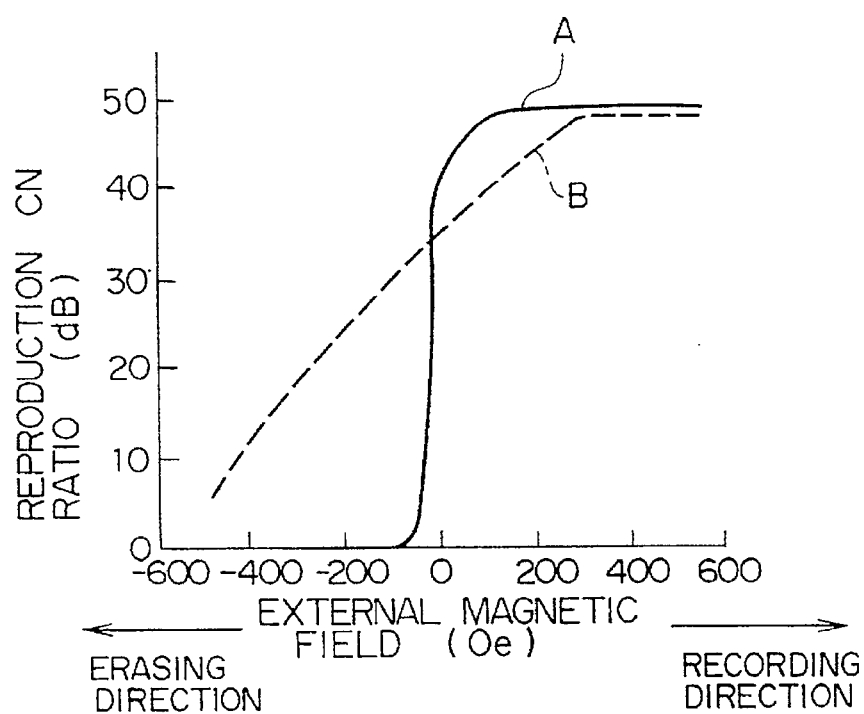
FIG. 28 is a graph comparing the recording and erasing characteristics of the magneto-optical recording medium according to the fourth embodiment with those of a conventional magneto-optical recording medium.

FIG. 28 shows the comparison of the recording/erasing characteristics of the magneto-optical recording medium according to the example of the present invention shown in FIG. 25 with that of the magneto-optical recording medium not provided with an auxiliary magnetic film. The recording/ erasing characteristics used here refer to the change of a reproduction CN ratio caused when the magnitude and direction of an external magnetic field imposed while recording is changed. Note that the curve A in FIG. 28 is the characteristic curve of the magneto-optical recording medium according to the example of the present invention and the curve B is the characteristic curve of the conventional magneto-optical recording medium.

As apparent from the figure, in the conventional magneto-optical recording medium (curve B) the reproduction CN ratio does not reach the saturated value unless the external magnetic field of about 330 Oe is imposed in a recording direction, whereas in the magneto-optical recording medium according to the example of the present invention (curve A) the reproduction CN ratio reaches the saturated value only by imposing the external magnetic field of about 100 Oe, from which it is found that the magneto-optical recording medium of the present invention can perfectly record data by a smaller external magnetic field.

Further, the conventional magneto-optical recording medium (curve B) cannot make the reproduction CN ratio zero unless the external magnetic field of about 600 Oe or more is imposed in an erasing direction, whereas the magneto-optical recording medium according to the example of the present invention (curve A) can make the reproduction CN ratio zero by only imposing the external magnetic field of about 50 Oe in an erasing direction, from which it is also found that the magneto-optical recording medium of the present invention can erase data by a smaller external magnetic field.

Consequently, it can be testified that the magneto-optical recording medium of the present invention has recording/ erasing characteristics which enable data to be securely overwritten by an external magnetic field modulation system.

Figure 29:
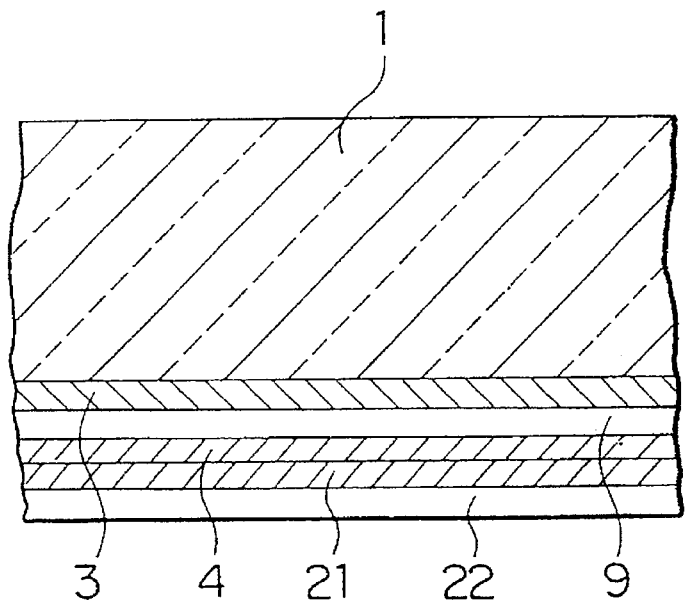
FIG. 29 is a cross sectional view of a modified example of the magneto-optical recording medium according to the fourth embodiment.

FIGS. 29 and 30 are enlarged cross sectional views of the main part of modified examples. In these figures, 1 designates a transparent substrate, 3 designates an enhancement film, 4 designates a magneto-optical recording film, 21 designates a protective film, 22 designates a reflection film, and 9 designates an auxiliary magnetic film.

In the case of the example shown in FIG. 29, the auxiliary magnetic film 9 is formed between the enhancement film 3 and the magneto-optical recording film 4, whereas in the case of the example shown in FIG. 30, the auxiliary magnetic films 9 are formed on both surfaces of the magneto-optical recording film 4.

Fifth Embodiment

Figure 31:
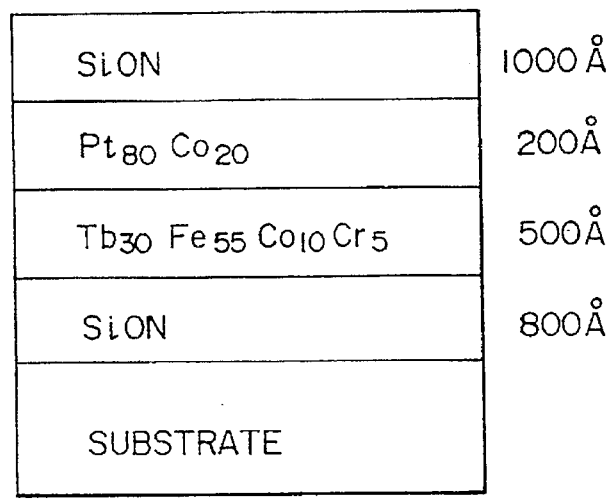
FIG. 31 is a cross sectional view of the magneto-optical recording medium according to a fifth embodiment of the present invention.
Figure 32:
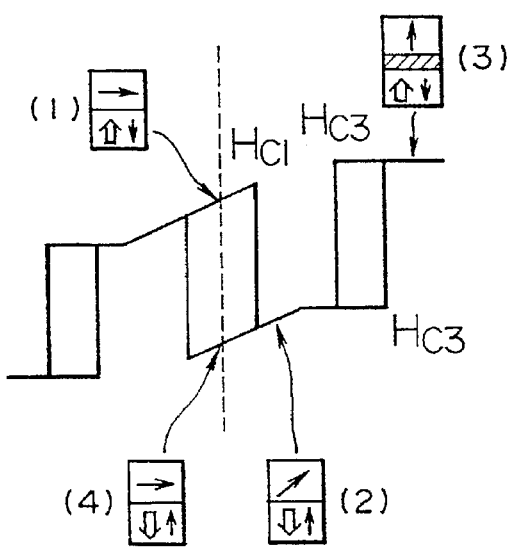
FIG. 32 shows a triple loop hysteresis exhibited by the magneto-optical recording medium according to the fifth embodiment.

FIG. 31 shows an arrangement example of the medium showing the characteristics of the invention according to Fifth Embodiment. When heated to the vicinity of the Curie temperature, the medium exhibits a triple loop as shown in FIG. 32, which is caused by the generation of the region in which the exchange bonding force between the above auxiliary magnetic film and the above magneto-optical recording film exceeds the interaction between the magnetization of the magneto-optical recording film and the external magnetic field.

Figure 33:
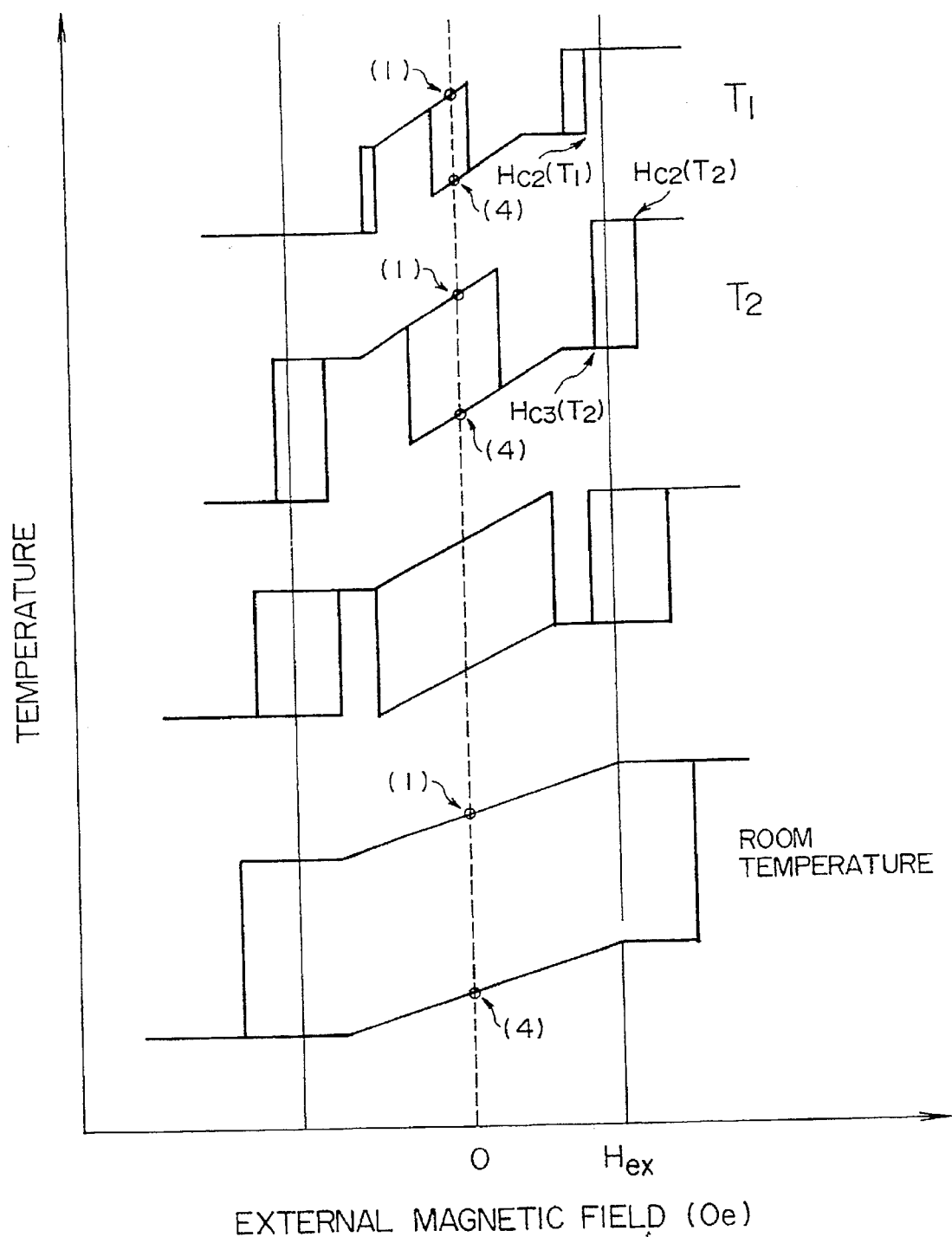
FIG. 33 is a graph showing the relationship between the external magnetic field and temperature in the fifth embodiment.

FIG. 33 shows the temperature change of the hysteresis of a magnetic substance exhibiting the characteristics. The action of the present invention will be produced when $T_1$, $T_2$, and $H_{ex}$ are determined as follows in the characteristics. More specifically:

① after a magneto-optical recording medium has been heated to a temperature $T_1$ with a laser beam level $P_H$ and a magnetic field $H_{ex}$ (:$H_{C2}$ ($T_1$)<$H_{ex}$) has been imposed, the temperature thereof is lowered and thereafter when the magnetic field is removed, the state goes to (1) in any case in which the initial state is at (1) or (4);

② after a magneto-optical recording medium has been heated to a temperature $T_1$ with a laser beam level $P_L$ ($P_H$>$P_L$>reproduction beam) and a magnetic field $H_{ex}$ ($H_{C3}$ ($T_2$)<$H_{C2}$($T_2$) ) has been imposed, the temperature thereof is lowered and thereafter when the magnetic field is removed, the state goes to (4) in any case in which the initial state is at (1) or (4); and ③ that is, new recording can be carried out regardless of the previous recording state in which a laser power is irradiated so that a film temperature becomes $T_1$ and $T_2$, respectively under a constant magnetic field $H_{ex}$, that is, overwriting can be carried out without the need for an erasing procedure.

The present invention relates to a magnetic substance as a whole having the above characteristics.

Note, that the magneto-optical recording medium described in Fifth Embodiment can record, reproduce and erase data by using a magneto-optical medium recording/ reproducing unit which is provided with a magnetic head, electromagnet or permanent magnet capable of imposing a magnetic filed having a given value $H_{ex}$ to the portion, where a laser beam is irradiated, of a medium having the characteristics described in FIG. 30 and an optical head for irradiating a laser beam the power of which is controlled to $P_H$ and $P_L$ necessary to modulate a film temperature to $T_1$ and $T_2$, and $P_R$ necessary to reproduce data.

As described above, according to the present invention, since the ferromagnetic reflection film or heat control layer having a suitable thermal conductivity is laminated on the backside of the magneto-optical recording medium viewed from the transparent substrate side, heat is properly diffused when a laser beam is irradiated, with the result that a laser power necessary to record and erase data need not be increased and moreover the reduction of a reproduction signal level, which is caused by repeatedly recording, reproducing and erasing data, can be prevented in a large amount.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A magneto-optical laminated recording medium comprising:

a transparent substrate;

a first enhancement film which comprises silicon nitride provided on the surface of said substrate;

a magneto-optical recording film provided on said first enhancement film, said magneto-optical recording film comprising a rare earth metal-transition metal amorphous vertically-magnetized film which further comprises at least one element selected from the group consisting of N and O in a total amount of from 0.1 to 5.0 at %;

an auxiliary magnetic film having spontaneous magnetization provided on said magneto-optical recording film, regulated such that a difference between the Curie temperature of said auxiliary magnetic film and that of said magneto-optical recording film is 150° C. or less, whereby the magnetic moment of said auxiliary magnetic film is rotated in the direction of an external magnetic field, maintaining an exchange coupling force to said magneto-optical recording film when a laser beam is irradiated upon said auxiliary magnetic film to record and erase data;

a second enhancement film which comprises silicon nitride provided on said auxiliary magnetic film; and a heat control layer provided on said second enhancement film, wherein said second enhancement film has a thickness of from 200 to 300 Å, and said heat control layer serves as a reflection film having a reflectance of 70% or higher to a reproduction beam and has a thermal conductivity of 0.14 to 0.25 W/cm.deg at recording/ reproducing/erasing temperatures.

2. The magneto-optical laminated recording medium according to claim 1, wherein said heat control layer is composed of an alloy of at least one metal element selected from the group consisting of Al, Ag, Au, Cu and Be, and at least one metal element selected from the group consisting of Cr, Ti, Ta, Sm, Si, Rb, Pe, Nb, Mo, Li, Mg, W and Zr.

3. The magneto-optical laminated recording medium according to claim 1, wherein thickness of said heat control layer is in the range of from 500 to 1000 Å.

4. The magneto-optical laminated recording medium according to claim 1, wherein said auxiliary magnetic film comprises a CoPt alloy, wherein the content of Pt therein is regulated to 60 to 95 at %.

5. The magneto-optical laminated recording medium according to claim 1, wherein said auxiliary magnetic film is composed of an alloy of a noble metal and transition metal.

6. The magneto-optical laminated recording medium according to claim 1, wherein said auxiliary magnetic film is composed of at least one of a PtCo alloy and AlCo alloy.

7. The magneto-optical laminated recording medium according to claim 1, wherein said heat control layer comprises an AlTi alloy having a Ti content therein within the range of from 6 to 10 at %.

8. The magneto-optical laminated recording medium according to claim 1, wherein said heat control layer comprises an alloy of at least one metal element selected from the group consisting of Ag, Au, Cu and Be, and at least one metal element selected from the group consisting of Cr, Ta, Sm, Si, Rb, Pe, Nb, Mo, Li, Mg, W and Zr.

9. A magneto-optical laminated recording medium comprising:
 a transparent substrate;
 a first enhancement film which comprises silicon nitride provided on said substrate;
 a magneto-optical recording film provided on said first enhancement film;
 an auxiliary magnetic film provided on said magneto-optical recording film, wherein the difference between the Curie temperature of said auxiliary magnetic film and that of said magneto-optical recording film is 150° C. or less;
 a second enhancement film which comprises silicon nitride provided on said auxiliary magnetic film; and
 a heat control layer provided on said second enhancement film, said heat control layer having a thermal conductivity of 0.14 to 0.25 W/cm.deg at recording/reproducing/erasing temperatures.

10. The magneto-optical laminated recording medium according to claim 9, wherein said heat control layer comprises an AlTi alloy having a Ti content therein within the range of from 6 to 10 at %.

11. The magneto-optical laminated recording medium according to claim 9, wherein said heat control layer comprises an alloy of at least one metal element selected from the group consisting of Al, Ag, Au, Cu and Be, and at least one metal element selected from the group consisting of Cr, Ti, Ta, Sm, Si, Rb, Pe, Nb, Mo, Li, Mg, W and Zr.

12. The magneto-optical laminated recording medium according to claim 9, wherein a thickness of said heat control layer is in the range of from 500 to 1000 Å.

13. The magneto-optical laminated recording medium according to claim 9, wherein said magneto-optical recording film comprises a rare earth metal-transition metal amorphous vertically-magnetized film having the composition:

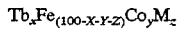

wherein
 15 at %≦X≦30 at %
 5 at %≦Y≦15 at %
 0 at %≦Z≦10 at %
and M is at least one element selected from the group consisting of Nb, Cr and Pt.

14. The magneto-optical laminated recording medium according to claim 9, wherein said magneto-optical recording film comprises a rare earth metal-transition metal amorphous vertically-magnetized film which further includes nitrogen in a total amount of from 0.1 to 5.0 at %.

15. The magneto-optical laminated recording medium according to claim 9, wherein said magneto-optical recording film comprises a rare earth metal-transition metal amorphous vertically-magnetized film which further includes oxygen in a total amount of from 0.1 to 5.0 at %.

16. The magneto-optical laminated recording medium according to claim 9, wherein said auxiliary magnetic film comprises a CoPt alloy, wherein the content of Pt therein is within the range from 60 to 95 at %.

17. The magneto-optical laminated recording medium according to claim 9, wherein said auxiliary magnetic film is composed of an alloy of a noble metal and a transition metal.

18. The magneto-optical laminated recording medium according to claim 9, wherein the auxiliary magnetic film is composed of at least one of a PtCo alloy and an AlCo alloy.

19. The magneto-optical laminated recording medium according to claim 9, wherein said magneto-optical recording film is composed of a thin film selected from the group consisting of a rare earth metal-transition metal amorphous vertically-magnetized film, Pt—Mn—Sb alloy film, a laminate of alternating Pt films and Co films Mn—Bi alloy film, a ferrite film and a garnet film.

20. The magneto-optical laminated recording medium according to claim 9, wherein said magneto-optical recording film is a magnetic substance having at least one site thereon composed of a transition metal in which the direction of the magnetic moment of said transition metal site of said magneto-optical recording film is the same as that of the total magnetization of said magneto-optical recording film at temperatures equal to or less than the Curie temperature of said magneto-optical recording film.

21. The magneto-optical laminated recording medium according to claim 9, wherein said magneto-optical recording film is a ferrimagnetic substance having at least one site thereon composed of a transition metal in which the direction of the magnetic moment of said transition metal site of said magneto-optical recording film is opposite to that of the total magnetization of said magneto-optical recording film at temperatures equal to or less than the Curie temperature of said recording film.

22. The magneto-optical laminated recording medium according to claim 9, wherein said second enhancement film has a thickness of from 200 to 300 Å.

23. The magneto-optical laminated recording medium according to claim 9, wherein said heat control layer comprises an alloy of at least one metal element selected from the group consisting of Ag, Au, Cu and Be, and at least one metal element selected from the group consisting of Cr, Ta, Sm, Si, Rb, Pe, Nb, Mo, Li, Mg, W and Zr.

24. The magneto-optical laminated recording medium according to claim 9, wherein said heat control layer serves as a reflection film having a reflectance of 70% or higher to a reproduction beam.

25. A magneto-optical recording medium suitable for data recording and data erasing by the application of an external magnetic field, comprising:
 a transparent substrate;
 a single layer or multi-layer thin film carried on said transparent substrate and comprised of at least a magneto-optical recording film; and
 an auxiliary magnetic film arranged in contact with said magneto-optical recording film and having a spontaneous magnetization and a Curie temperature differing from that of said magneto-optical recording film in the range of 150° C. or less, said auxiliary magnetic film having a magnetic property such that application of an external magnetic field of 200 Oe or less thereto cause its magnetic moment to be rotated in the direction of said external magnetic field at temperatures approximately equal to the Curie temperature of said magneto-optical recording film, whereby a resulting exchange coupling force between said auxiliary magnetic film and said magneto-optical recording film provides for a rotation of the magnetization of said magneto-optical recording film.

26. The magneto-optical recording medium according to claim 25, wherein said auxiliary magnetic film is composed of a CoPt alloy containing 60 to 95 atom-% of Pt.

27. The magneto-optical recording medium according to claim 25, wherein said magneto-optical recording film is composed of a thin film selected from the group consisting of a rare earth metal-transition metal amorphous vertically-magnetized film, Pt—Mn—Sb alloy film, a laminate of alternating Pt films and Co films, Mn—Bi alloy film, a ferrite film and a garnet film.

28. The magneto-optical recording medium according to claim 25, wherein said magneto-optical recording film is composed of a rare earth metal-transition metal amorphous vertically-magnetized film having the following composition:

$$Tb_xFe_{(100-x-y-z)}Co_yM_z$$

where 15 atom-% $\leq$ X $\leq$ 30 atom-%

5 atom-% $\leq$ Y $\leq$ 15 atom-%

0 atom-% $\leq$ Z $\leq$ 10 atom-% and M is at least one element selected from the group consisting of Nb, Cr and Pt.

29. The magneto-optical recording medium according to claim 25, wherein said magneto-optical recording film is a magnetic substance having at least one site thereon composed of a transition metal in which the direction of the magnetic moment of said transition metal site contained therein is the same as that of the total magnetization of said magneto-optical recording film at temperatures equal to or less than the Curie temperature of said magneto-optical recording film.

30. A magneto-optical recording medium comprising:

a transparent substrate;

a first enhancement film on said substrate;

an auxiliary magnetic film on said first enhancement film;

a magneto-optical recording film on said auxiliary magnetic film; a second enhancement film on said magneto-optical recording film; and a heat control layer on said second enhancement film;

wherein the difference between the Curie temperature of said auxiliary magnetic film and that of said magnetic-optical recording film is 150° C. or less, and wherein said second enhancement film has a thickness of from 200 to 300 Å, said heat control layer has a reflectance of 70% or higher to a reproduction beam and has a thermal conductivity of 0.14 to 0.25 W/cm.deg at recording/reproducing/erasing temperatures.

* * * * *